US011333097B2

United States Patent
Hashimoto et al.

(10) Patent No.: US 11,333,097 B2
(45) Date of Patent: May 17, 2022

(54) INTERNAL COMBUSTION ENGINE CONDITION DETERMINATION APPARATUS, INTERNAL COMBUSTION ENGINE CONDITION DETERMINATION SYSTEM, DATA ANALYZING APPARATUS, AND INTERNAL COMBUSTION ENGINE CONTROL APPARATUS

(71) Applicant: TOYOTA JIDOSHA KABUSHIKI KAISHA, Toyota (JP)

(72) Inventors: Yohsuke Hashimoto, Nagakute (JP); Akihiro Katayama, Toyota (JP); Yuta Oshiro, Nagoya (JP); Kazuki Sugie, Toyota (JP); Naoya Oka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/914,716

(22) Filed: Jun. 29, 2020

(65) Prior Publication Data

US 2021/0062747 A1  Mar. 4, 2021

(30) Foreign Application Priority Data

Aug. 30, 2019  (JP) .............................. JP2019-157749

(51) Int. Cl.
*F02D 41/24* (2006.01)
*F02D 41/00* (2006.01)
(Continued)

(52) U.S. Cl.
CPC .......... *F02D 41/2454* (2013.01); *F02B 75/18* (2013.01); *F02D 41/008* (2013.01);
(Continued)

(58) Field of Classification Search
CPC .. F02D 41/2454; F02D 41/009; F02D 41/008; F02D 41/2438; F02D 41/2496;
(Continued)

(56) References Cited

U.S. PATENT DOCUMENTS 5,044,195 A * 9/1991 James .................... G01M 15/11
                                                      73/114.05
5,093,792 A    3/1992 Taki et al.
(Continued)

FOREIGN PATENT DOCUMENTS

JP          01-301946 A    12/1989
JP          04-091348 A     3/1992
(Continued)

OTHER PUBLICATIONS

MIsfire Detection Using a Neural Network Based Pattern Recognition Technique; Retreived from the interent Aug. 20, 2021 "https://ieeexplore.ieee.org/document/4287338"; Published to internet IEEE Xplore Aug. 13, 2007. (Year: 2007).*

(Continued)

*Primary Examiner* — Sizo B Vilakazi
*Assistant Examiner* — Brian R Kirby
(74) *Attorney, Agent, or Firm* — Oblon, McClelland, Maier & Neustadt, L.L.P.

(57) ABSTRACT

An internal combustion engine condition determination apparatus includes a storage device; and an execution device. The storage device stores mapping data that defines a mapping. The execution device is configured to execute an acquisition process of acquiring an internal combustion engine state variable every time a crankshaft of an internal combustion engine rotates by a predetermined angle, and a determination process of determining a condition of the internal combustion engine based on an output obtained through the mapping using the internal combustion engine
(Continued)

state variable as an input. The mapping data is trained by machine learning. The execution device is configured to prohibit the determination process when a rotation speed of the crankshaft is equal to or higher than a predetermined threshold.

6 Claims, 12 Drawing Sheets

(51) Int. Cl.
*F02B 75/18* (2006.01)
*G06N 20/00* (2019.01)

(52) U.S. Cl.
CPC ....... *F02D 41/009* (2013.01); *F02D 41/2438* (2013.01); *F02D 41/2496* (2013.01); *G06N 20/00* (2019.01); F02D 2200/101 (2013.01); F02D 2200/1015 (2013.01)

(58) Field of Classification Search
CPC ....... F02D 2200/1015; F02D 2200/101; F02D 41/1498; F02D 41/0085; F02D 35/023; F02D 41/1405; F02D 45/00; F02B 75/18; F02B 77/086; G06N 20/00; G06N 3/0427; G06N 20/10; G06N 20/20; G06N 3/0445; G06N 3/0454; G06N 3/08
See application file for complete search history.

(56) References Cited

U.S. PATENT DOCUMENTS

| | | | | |
|---|---|---|---|---|
| 5,105,657 A * | 4/1992 | Nakaniwa | ........... | G01M 15/042 73/114.04 |
| 5,193,513 A * | 3/1993 | Marko | ................ | G01M 15/106 123/481 |
| 5,287,735 A * | 2/1994 | Klauber | ............. | G01M 15/042 73/114.02 |
| 5,287,737 A * | 2/1994 | Osawa | .................. | G01M 15/11 73/114.07 |
| 5,357,790 A * | 10/1994 | Hosoya | ................. | G01M 15/11 123/492 |
| 5,442,955 A * | 8/1995 | Baba | ...................... | G01M 15/11 340/439 |
| 5,495,415 A * | 2/1996 | Ribbens | ................ | G01M 15/11 123/436 |
| 5,559,285 A * | 9/1996 | Bryant | ................ | G01M 15/106 123/406.27 |
| 5,576,963 A * | 11/1996 | Ribbens | ................ | G01M 15/11 123/436 |
| 5,639,960 A * | 6/1997 | Nakagawa | ............. | G01M 15/11 701/111 |
| 5,699,253 A * | 12/1997 | Puskorius | ............. | G01M 15/11 701/111 |
| 5,714,946 A * | 2/1998 | Gottshall | ............... | G07C 5/008 340/3.1 |
| 5,732,382 A * | 3/1998 | Puskorius | ............. | G01M 15/11 123/436 |
| 6,292,738 B1 * | 9/2001 | Feldkamp | ............. | G01M 15/11 701/111 |
| 6,298,717 B1 * | 10/2001 | Nishimura | ............ | G01M 15/11 73/35.08 |
| 6,434,541 B1 * | 8/2002 | Tawel | .................... | G01M 15/11 706/30 |
| 6,768,308 B2 * | 7/2004 | Hanazaki | ............. | F02D 35/021 324/378 |
| 6,851,302 B2 * | 2/2005 | Hashiguchi | ........... | G01M 15/11 73/114.02 |
| 7,136,739 B2 * | 11/2006 | Miyata | .................. | G01M 15/11 73/114.04 |
| 8,813,544 B2 * | 8/2014 | Terada | ................ | F02D 41/2451 73/114.04 |
| 2003/0216853 A1 * | 11/2003 | Jacobson | ............. | F02D 35/023 701/111 |
| 2009/0158830 A1 * | 6/2009 | Malaczynski | .......... | G01M 15/11 73/114.04 |
| 2014/0195098 A1 * | 7/2014 | Lorenz | .................... | G06F 17/00 701/29.3 |
| 2017/0039785 A1 * | 2/2017 | Richter | .................. | G07C 5/008 |

FOREIGN PATENT DOCUMENTS

| | | |
|---|---|---|
| JP | 10-252536 A | 9/1998 |
| JP | 2006-183502 A | 7/2006 |
| JP | 2018-178810 A | 11/2018 |
| JP | 2019-019755 A | 2/2019 |
| JP | 6547991 B1 | 7/2019 |

OTHER PUBLICATIONS

Ford_2006MY_OBD_System_Operation_Manual_NPL; Retreived from the internet Aug. 20, 2021; URL: http://www.fordservicecontent.com/ford_content/catalog/motorcraft/OBDSM608.pdf; Published on or before Nov. 12, 2007; See pp. 13-15 and 17 for for minimum/maximum conditions required for entry/exit of via NNM (Year: 2007).*

* cited by examiner

INTERNAL COMBUSTION ENGINE CONDITION DETERMINATION APPARATUS, INTERNAL COMBUSTION ENGINE CONDITION DETERMINATION SYSTEM, DATA ANALYZING APPARATUS, AND INTERNAL COMBUSTION ENGINE CONTROL APPARATUS

INCORPORATION BY REFERENCE

The disclosure of Japanese Patent Application No. 2019-157749 filed on Aug. 30, 2019 including the specification, drawings and abstract is incorporated herein by reference in its entirety.

BACKGROUND

1. Technical Field

The disclosure relates to an internal combustion engine condition determination apparatus, an internal combustion engine condition determination system, a data analyzing apparatus, and an internal combustion engine control apparatus.

2. Description of Related Art

A misfire detection system described in Japanese Unexamined Patent Application Publication No. 4-91348 (JP 4-91348 A) uses a hierarchical neural network model configured such that time-series data sampled in every predetermined period and indicating the rotation speed of a crankshaft of an internal combustion engine is input to an input layer and information on a misfiring cylinder is output from an output layer. The hierarchical neural network model is trained by supervised learning.

SUMMARY

In the misfire detection system described in JP 4-91348 A, the frequency, with which a misfire is detected, increases as the rotation speed of the crankshaft increases. When the rotation speed of the crankshaft is high, the calculation load on a device may increase due to the hierarchical neural network model. The problems may be caused also in the case where detection or calculation is performed using the hierarchical neural network model every time the crankshaft rotates by a predetermined angle, as well as in the case where a misfire is detected.

A first aspect of the disclosure relates to an internal combustion engine condition determination apparatus. The internal combustion engine condition determination apparatus includes a storage device; and an execution device. The storage device stores mapping data that defines a mapping between an input and an output, the input being an internal combustion engine state variable, the output being a determination result related to a condition of an internal combustion engine, the internal combustion engine state variable being a parameter indicating the condition of the internal combustion engine. The execution device is configured to execute an acquisition process of acquiring the internal combustion engine state variable every time a crankshaft of the internal combustion engine rotates by a predetermined angle, and a determination process of determining the condition of the internal combustion engine based on the output obtained through the mapping using the internal combustion engine state variable as the input. The mapping data is trained by machine learning. The execution device is configured to prohibit the determination process when a rotation speed of the crankshaft is equal to or higher than a predetermined threshold.

In the configuration described above, the determination process is prohibited when the rotation speed of the crankshaft is equal to or higher than the predetermined threshold. Therefore, the calculation load on the execution device decreases. Thus, there is no need to employ a high-performance and high-cost execution device for a case where the rotation speed of the crankshaft is high.

In the above-described aspect, the storage device may store a determination function, and the determination result may be obtained by substituting at least one of the internal combustion engine state variable and a variable derived from the internal combustion engine state variable into the determination function; and the execution device may be configured to execute, when the rotation speed of the crankshaft is equal to or higher than the predetermined threshold, the determination process of determining the condition of the internal combustion engine using the determination function.

In the configuration described above, when the rotation speed of the crankshaft is equal to or higher than the predetermined threshold, the determination process in which the calculation load is relatively small is executed, instead of the determination process using the mapping. Therefore, it is possible to restrain an excessive increase in the calculation load while continuing the detection of the condition of the internal combustion engine.

In the above-described aspect, the condition of the internal combustion engine may be whether a misfire occurs in the internal combustion engine; the execution device may be configured to execute, when a determination is made through the determination process that the misfire occurs, an addressing process of addressing the misfire by operating predetermined hardware; the mapping data may define the mapping between the input that is time-series data including an instantaneous speed parameter in each of a plurality of successive second intervals within a first interval, and the output that is a probability of the misfire in the internal combustion engine; the execution device may be configured to acquire, in the acquisition process, the instantaneous speed parameter based on a detection value from a sensor configured to detect a rotational behavior of the crankshaft of the internal combustion engine; the instantaneous speed parameter may be a parameter based on the rotation speed of the crankshaft of the internal combustion engine; the first interval may be a rotation angle interval of the crankshaft, the first interval including a compression top dead center; each of the second intervals may be smaller than an interval between rotation angles at each of which the compression top dead center is reached; and the execution device may be configured to output the probability of the misfire in at least one cylinder in which the compression top dead center is reached within the first interval, using the mapping.

In the configuration described above, the internal combustion engine condition determination apparatus can be applied to the determination as to whether a misfire occurs in the internal combustion engine as the condition of the internal combustion engine. When determination is made that the misfire occurs, the addressing process can be executed to address the misfire.

In the above-described aspect, the internal combustion engine may include a plurality of cylinders; the condition of the internal combustion engine may be variation in an air-fuel ratio among the plurality of cylinders; the execution device may be configured to execute, when a determination is made through the determination process that the variation in the air-fuel ratio occurs among the plurality of cylinders, an addressing process of addressing a high degree of the variation in the air-fuel ratio by operating predetermined hardware; the mapping data may define the mapping between the input including a rotation waveform variable and an air-fuel ratio detection variable based on an output from an air-fuel ratio sensor in each of a plurality of third intervals, and the output including an imbalance variable indicating a degree of variation among actual air-fuel ratios occurring when fuel injection valves are operated such that air-fuel ratios of air-fuel mixtures in the plurality of cylinders are controlled to be equal to each other; the execution device may be configured to acquire, in the acquisition process, the air-fuel ratio detection variable in each of the plurality of third intervals and the rotation waveform variable based on a detection value from a sensor configured to detect a rotational behavior of the crankshaft; the rotation waveform variable may indicate a difference between values of an instantaneous speed variable based on the rotation speed of the crankshaft in a plurality of fourth intervals; the third intervals and the fourth intervals may be angle intervals of the crankshaft, each of the angle intervals being smaller than an interval between rotation angles at each of which a compression top dead center is reached; and the rotation waveform variable may be included in time-series data within a predetermined angle interval larger than the interval between the rotation angles at each of which the compression top dead center is reached, and values of the air-fuel ratio detection variable may be included in time-series data within the predetermined angle interval larger than the interval between the rotation angles at each of which the compression top dead center is reached.

In the configuration described above, the internal combustion engine condition determination apparatus can be applied to the determination of the variation in the air-fuel ratio among the plurality of cylinders as the condition of the internal combustion engine. When determination is made that the variation in the air-fuel ratio occurs among the cylinders, the addressing process can be executed to address the variation.

A second aspect of the disclosure relates to an internal combustion engine condition determination system. The internal combustion engine condition determination system includes the execution device; and the storage device. The execution device includes a first execution device and a second execution device. The first execution device is mounted on a vehicle, and is configured to execute the acquisition process, and a vehicle-side transmission process of transmitting data acquired through the acquisition process to an outside of the vehicle. The second execution device is disposed outside the vehicle, and is configured to execute an external reception process of receiving the data transmitted through the vehicle-side transmission process, and the determination process. In the configuration described above, the determination process is executed outside the vehicle, and thus, the calculation load on the on-board devices can be reduced.

A third aspect of the disclosure relates to a data analyzing apparatus including the second execution device; and the storage device.

A fourth aspect of the disclosure relates to an internal combustion engine control apparatus including the first execution device.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

An internal combustion engine condition determination apparatus according to a first embodiment is described below with reference to the drawings.

Figure 1:
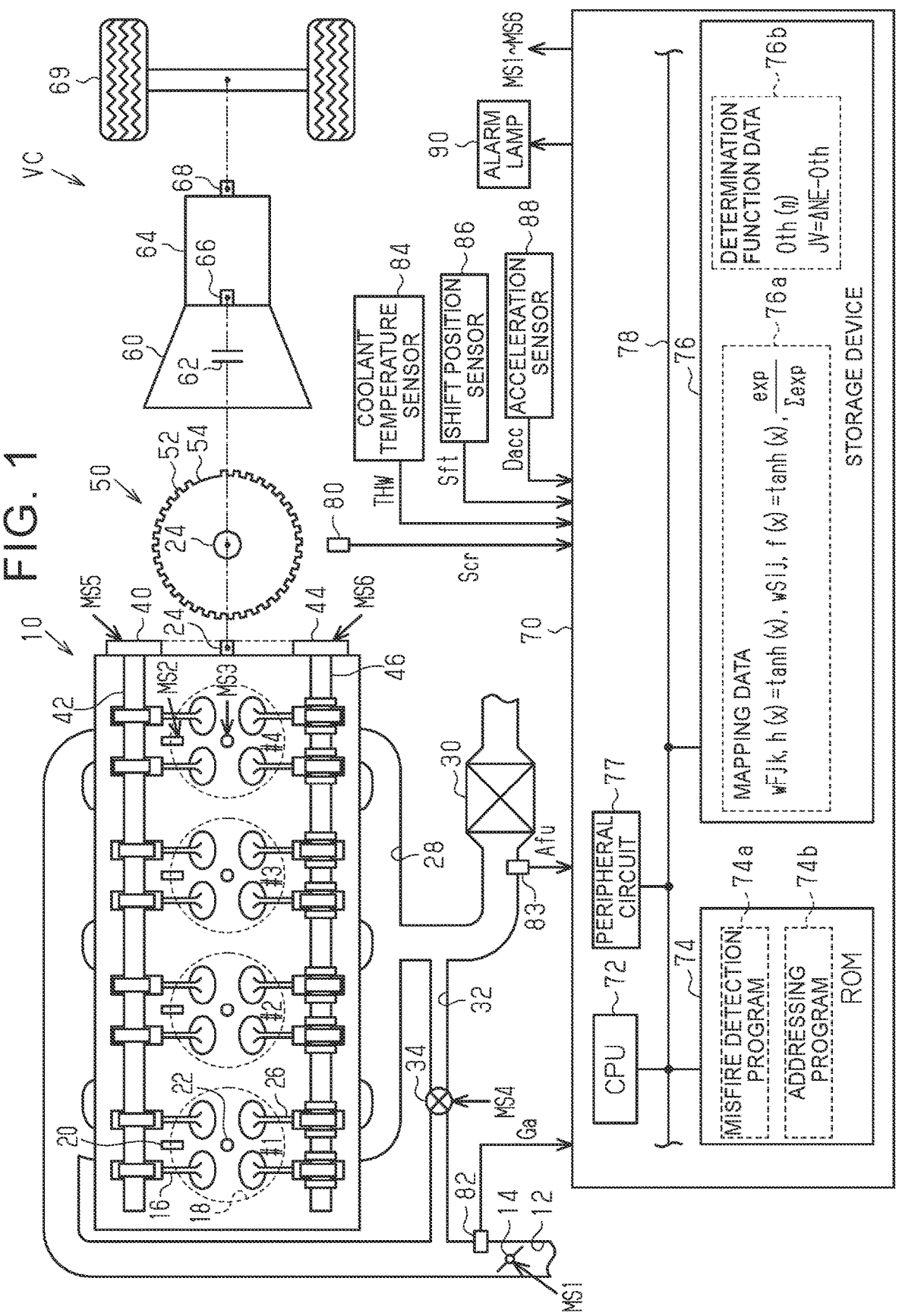
FIG. 1 is a diagram illustrating the configurations of a control apparatus and a vehicle drive system according to a first embodiment.

FIG. 1 illustrates a vehicle VC including an internal combustion engine 10. In the internal combustion engine 10, an intake passage 12 is provided with a throttle valve 14. Air taken into the intake passage 12 flows into combustion chambers 18 of cylinders #1 to #4 by opening intake valves 16. Fuel is injected into each combustion chamber 18 by a fuel injection valve 20. In the combustion chamber 18, an air-fuel mixture containing air and fuel is burned through spark discharge caused by an ignition device 22, and energy generated by burning the air-fuel mixture is obtained as rotational energy of a crankshaft 24. The burned air-fuel mixture is discharged into an exhaust passage 28 as exhaust gas by opening exhaust valves 26. The exhaust passage 28 is provided with a three-way catalyst 30 having oxygen storage capability. The exhaust passage 28 communicates with the intake passage 12 via an exhaust gas recirculation (EGR) passage 32. The EGR passage 32 is provided with an EGR valve 34 configured to adjust the channel sectional area of the EGR passage 32.

Rotational power of the crankshaft 24 is transmitted to an intake cam shaft 42 via an intake valve timing changing device 40, and to an exhaust cam shaft 46 via an exhaust valve timing changing device 44. The intake valve timing changing device 40 changes a relative rotational phase difference between the intake cam shaft 42 and the crankshaft 24. The exhaust valve timing changing device 44 changes a relative rotational phase difference between the exhaust cam shaft 46 and the crankshaft 24.

An input shaft 66 of a transmission 64 can be coupled to the crankshaft 24 of the internal combustion engine 10 via a torque converter 60. The torque converter 60 includes a lock-up clutch 62. The crankshaft 24 and the input shaft 66 are coupled together by engaging the lock-up clutch 62. Driving wheels 69 are mechanically coupled to an output shaft 68 of the transmission 64.

A crank rotor 50 is coupled to the crankshaft 24. The crank rotor 50 has a plurality of (34 in this case) teeth 52 indicating the rotation angle of the crankshaft 24. The crank rotor 50 basically has the teeth 52 at intervals of 10 degrees CA, but has one toothless portion 54 at which an interval between adjacent teeth 52 is 30 degrees CA. The toothless portion 54 indicates a reference rotation angle of the crankshaft 24. A crank angle sensor 80 is disposed near the crank rotor 50. The crank angle sensor 80 converts a magnetic flux change caused by approaching or departing movement of each tooth 52 into a square-wave pulse signal, and outputs the pulse signal. An output signal of the crank angle sensor 80 is hereinafter referred to as a crank signal Scr. In this embodiment, the crank angle sensor 80 is an example of a sensor configured to detect a rotational behavior of the crankshaft 24.

A control apparatus 70 controls the internal combustion engine 10, and operates the throttle valve 14, the fuel injection valves 20, the ignition devices 22, the EGR valve 34, the intake valve timing changing device 40, and the exhaust valve timing changing device 44 to control, for example, a torque and an exhaust gas component ratio that are controlled variables of the internal combustion engine 10. FIG. 1 illustrates operation signals MS1 to MS6 for the throttle valve 14, the fuel injection valves 20, the ignition devices 22, the EGR valve 34, the intake valve timing changing device 40, and the exhaust valve timing changing device 44.

To control the controlled variables, the control apparatus 70 refers to the crank signal Scr that is the output signal of the crank angle sensor 80, and an intake amount Ga detected by an airflow meter 82. The crank angle sensor 80 outputs pulses at angle intervals between the teeth 52 (10 degrees CA except the toothless portion 54). The control apparatus 70 refers to an upstream-side detection value Afu and a coolant temperature THW. The upstream-side detection value Afu is detected by an air-fuel ratio sensor 83 provided upstream of the three-way catalyst 30. The coolant temperature THW is the temperature of a coolant of the internal combustion engine 10 that is detected by a coolant temperature sensor 84. The control apparatus 70 refers to a shift position Sft of the transmission 64 and an acceleration Dacc in a vertical direction of the vehicle VC. The shift position Sft is detected by a shift position sensor 86. The acceleration Dacc is detected by an acceleration sensor 88.

The control apparatus 70 includes a central processing unit (CPU) 72, a read-only memory (ROM) 74, a storage device 76 including an electrically rewritable non-volatile memory, and a peripheral circuit 77, which can communicate with each other via a local network 78. The peripheral circuit 77 includes a circuit configured to generate a clock signal for defining internal operations, a power supply circuit, and a reset circuit.

The control apparatus 70 controls the controlled variables such that the CPU 72 executes a program stored in the ROM 74. The control apparatus 70 executes a process of determining whether the internal combustion engine 10 is misfiring.

Figure 2:
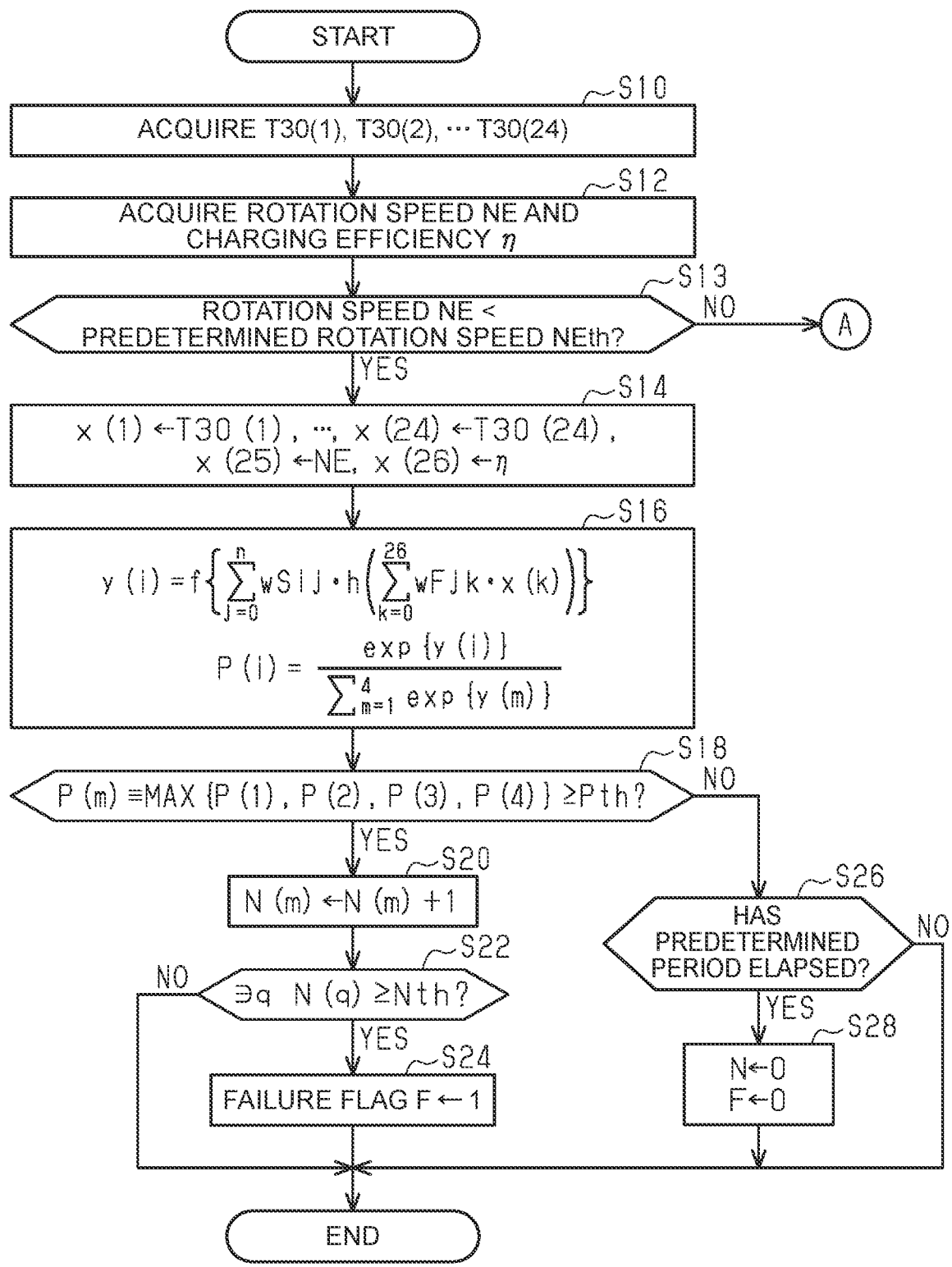
FIG. 2 is a flowchart illustrating a procedure of a misfire determination process according to the first embodiment.

FIG. 2 illustrates a procedure of a misfire detection process. The process illustrated in FIG. 2 is implemented when the CPU 72 repeatedly executes a misfire detection program 74a stored in the ROM 74 illustrated in FIG. 1 in, for example, every predetermined period. Step numbers of processes are hereinafter represented by numerals prefixed with "S".

In a series of processes illustrated in FIG. 2, the CPU 72 first acquires infinitesimal rotation times T30(1), T30(2), . . . T30(24) (S10). The infinitesimal rotation time T30 is calculated by the CPU 72 by measuring a time required for the crankshaft 24 to rotate by 30 degrees CA based on the crank signal Scr that is the output signal of the crank angle sensor 80. That is, the infinitesimal rotation time T30 functions as an internal combustion engine state variable that is acquired every time the crankshaft 24 rotates by 720 degrees CA. If the parenthesized numerals of the infinitesimal rotation times are different like T30(1), T30(2), and so on, the parenthesized numerals indicate the different rotation angle intervals within 720 degrees CA corresponding to one combustion cycle. That is, the infinitesimal rotation times T30(1) to T30(24) respectively indicate rotation times in angle intervals obtained by equally dividing the rotation angle range of 720 degrees CA by 30 degrees CA.

Specifically, the CPU 72 measures a time required for the crankshaft 24 to rotate by 30 degrees CA based on the crank signal Scr, and sets the measured time as a pre-filtering time NF30. Next, the CPU 72 calculates a post-filtering time AF30 through digital filtering using the pre-filtering time NF30 as an input. The CPU 72 calculates the infinitesimal rotation time T30 by normalizing the post-filtering time AF30 so that a difference between a local maximum value and a local minimum value of the post-filtering time AF30 within a predetermined period (for example, 720 degrees CA) is "1".

Next, the CPU 72 acquires a rotation speed NE and a charging efficiency η as parameters for defining an operating point (S12). The rotation speed NE is calculated by the CPU 72 based on the crank signal Scr that is the output signal of the crank angle sensor 80. The charging efficiency η is calculated by the CPU 72 based on the rotation speed NE and the intake amount Ga. The rotation speed NE is an average of rotation speeds when the crankshaft 24 rotates by angle intervals larger than an interval (180 degrees CA in this embodiment) between rotation angles at each of which a compression top dead center is reached (i.e., an interval between compression top dead centers of two cylinders). The rotation speed NE may be an average of rotation speeds when the crankshaft 24 rotates by rotation angles equal to or larger than a rotation angle of one rotation of the crankshaft 24. The average is not limited to a simple average, and may be, for example, an exponential moving average. The average is calculated based on a plurality of sampled values of, for example, the infinitesimal rotation time T30 when the crankshaft 24 rotates by a rotation angle equal to or larger than the rotation angle of one rotation. The charging efficiency η is a parameter for defining the amount of air charged into the combustion chamber 18.

Next, the CPU 72 determines whether the rotation speed NE is lower than a predetermined rotation speed NEth (S13). The predetermined rotation speed NEth is defined as a value at which a load of a calculation process using mapping data 76a described later is relatively large as compared to the processing capability of the CPU 72. When the rotation speed NE is lower than the predetermined rotation speed NEth (S13: YES), the CPU 72 inputs the values acquired through the processes of S10 and S12 to input variables x(1)

to x(26) of a mapping for calculating the probability of a misfire (S14). Specifically, the CPU 72 inputs an infinitesimal rotation time T30(s) to an input variable x(s), provided that "s=1 to 24". That is, the input variables x(1) to x(24) are time-series data of the infinitesimal rotation time T30. Further, the CPU 72 inputs the rotation speed NE to the input variable x(25) and the charging efficiency η to the input variable x(26).

Next, the CPU 72 calculates a probability P(i) of a misfire in a cylinder #i (i=1 to 4) by inputting the input variables x(1) to x(26) to the mapping defined by the mapping data 76a stored in the storage device 76 illustrated in FIG. 1 (S16). The mapping data 76a defines a mapping that makes it possible to output the probability P(i) of a misfire occurring in the cylinder #i in periods corresponding to the infinitesimal rotation times T30(1) to T30(24) acquired through the process of S10. The probability P(i) is obtained by quantifying the degree of likelihood of an actual misfire based on the input variables x(1) to x(26). In this embodiment, the maximum value of the probability P(i) of a misfire in the cylinder #i is smaller than "1", and the minimum value of the probability P(i) is larger than "0". That is, in this embodiment, the probability P(i) is obtained by quantifying the degree of likelihood of an actual misfire as a continuous value within a predetermined range larger than "0" and smaller than "1".

In this embodiment, the mapping is constituted by a neural network having one intermediate layer, and a softmax function that normalizes outputs from the neural network so that the sum of the probabilities P(1) to P(4) of a misfire is "1". The neural network includes an input-side coefficient wFjk (j=0 to n, k=0 to 26) and an activation function h(x). The activation function h(x) is an input-side nonlinear mapping that nonlinearly converts outputs from an input-side linear mapping defined by the input-side coefficient wFjk. In this embodiment, a hyperbolic tangent "tanh(x)" is exemplified as the activation function h(x). The neural network further includes an output-side coefficient wSij (i=1 to 4, j=0 to n) and an activation function f(x). The activation function f(x) is an output-side nonlinear mapping that nonlinearly converts outputs from an output-side linear mapping defined by the output-side coefficient wSij. In this embodiment, a hyperbolic tangent "tanh(x)" is exemplified as the activation function f(x). The value n indicates a dimension of the intermediate layer. In this embodiment, the value n is smaller than the dimension of the input variable x (26th dimension in this case). An input-side coefficient wFj0 is a bias parameter, which is a coefficient of an input variable x(0) when the input variable x(0) is defined as "1". The output-side coefficient wSi0 is a bias parameter, which is multiplied by "1". For example, the output-side coefficient wSi0 is attained when "wF00·x(0)+wF01·x(1)+ . . . " is defined as being universally infinite.

Specifically, the CPU 72 calculates a probability model y(i), which is an output from the neural network defined by the input-side coefficient wFjk, the output-side coefficient wSij, and the activation functions h(x) and f(x). The probability model y(i) is a parameter having a positive correlation with the probability of a misfire in the cylinder #i. The CPU 72 calculates the probability P(i) of a misfire in the cylinder #i based on an output from the softmax function using probability models y(1) to y(4) as inputs.

Next, the CPU 72 determines whether a maximum value P(m) among the probabilities P(1) to P(4) of a misfire is equal to or larger than a threshold Pth (S18). The variable m takes a value of 1 to 4. The threshold Pth is set to "½" or larger. When the CPU 72 determines that the maximum value P(m) is equal to or larger than the threshold Pth (S18: YES), the CPU 72 increments a count N(m) of a misfire in a cylinder #m having the maximum probability (S20). The CPU 72 determines whether any one of the counts N(1) to N(4) is equal to or larger than a predetermined count Nth (S22). When the CPU 72 determines that any one of the counts N(1) to N(4) is equal to or larger than the predetermined count Nth (S22: YES), the CPU 72 determines that a misfire occurs in a specific cylinder #q (q is one of 1 to 4) at a frequency higher than that in a permissible range, and substitutes "1" into a failure flag F (S24). At this time, the CPU 72 stores information on the misfiring cylinder #q in the storage device 76, and retains the information at least until the misfire ceases in the cylinder #q.

When the CPU 72 determines that the maximum value P(m) is smaller than the threshold Pth (S18: NO), the CPU 72 determines whether a predetermined period has elapsed from the process of S24 or a process of S28 described later (S26). The predetermined period is longer than a period of one combustion cycle, and may be 10 times or more as long as the period of one combustion cycle.

When the CPU 72 determines that the predetermined period has elapsed (S26: YES), the CPU 72 initializes the counts N(1) to N(4) and the failure flag F (S28). When the process of S24 or S28 is completed or when the determination result in the process of S22 or S26 is negative, the CPU 72 temporarily terminates the series of processes illustrated in FIG. 2.

Figure 3:
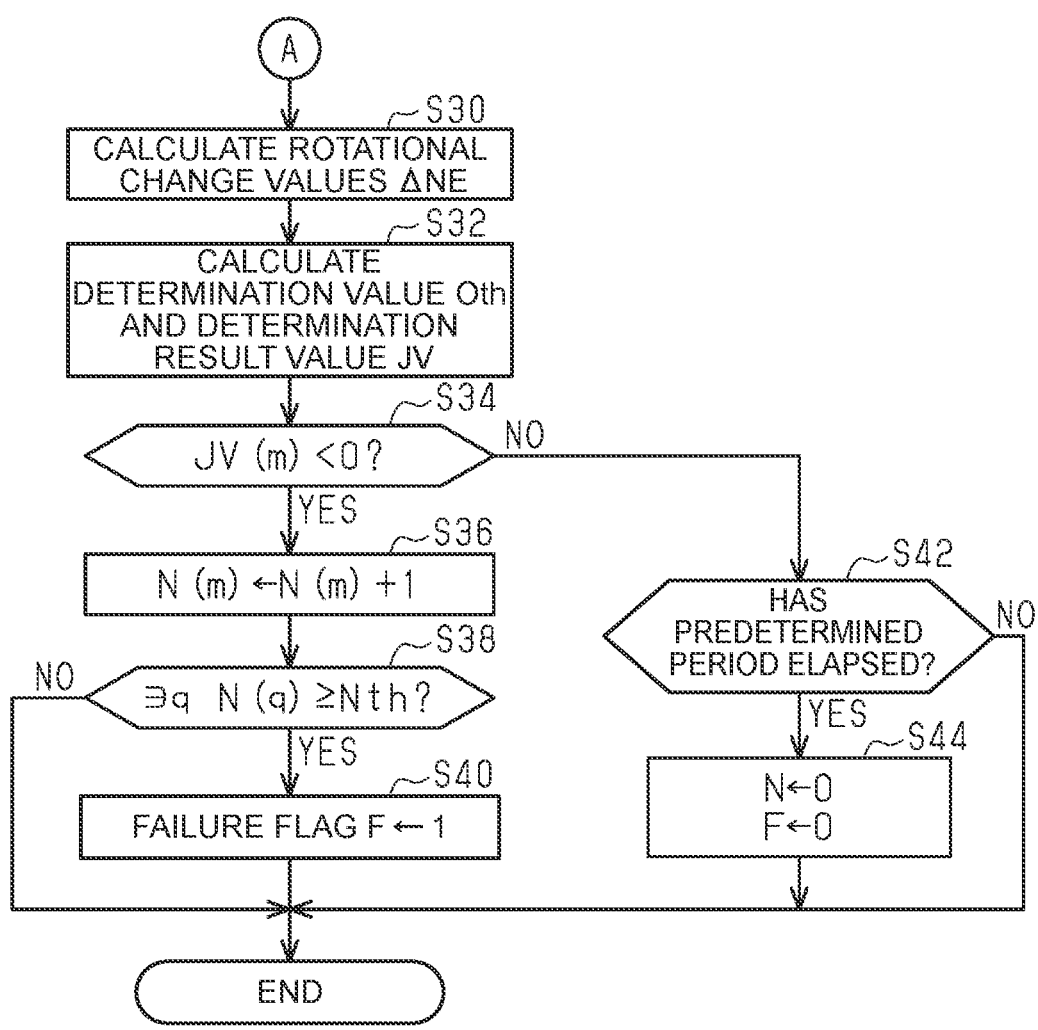
FIG. 3 is a flowchart illustrating the procedure of the misfire determination process according to the first embodiment.

When the rotation speed NE is equal to or higher than the predetermined rotation speed NEth (S13: NO), the CPU 72 prohibits, as illustrated in FIG. 3, the process of calculating the probability P(i) of a misfire in the cylinder #i (i=1 to 4) based on the mapping data 76a. Instead, the CPU 72 calculates a misfire determination result based on the infinitesimal rotation times T30(1), T30(2), . . . T30(24) and the charging efficiency η. Specifically, the CPU 72 first calculates a rotational change value ΔNE(i) based on the infinitesimal rotation times T30(1), T30(2), . . . T30(24) (S30). More specifically, the CPU 72 calculates cylinder-specific rotation speeds (i.e., rotation speeds in the respective cylinders) based on the infinitesimal rotation times T30(1), T30(2), . . . T30(24). The cylinder-specific rotation speed corresponds to a time required for rotation in an angle interval of 30 to 150 degrees after top dead center (ATDC) in each cylinder. Next, the CPU 72 calculates the rotational change value ΔNE(i) based on the cylinder-specific rotation speeds. Each of the rotational change values ΔNE is calculated in association with the compression top dead center of a corresponding one of the cylinders #1 to #4. For example, a rotational change value ΔNE(2) associated with the second cylinder #2 is a value obtained by subtracting a cylinder-specific rotation speed in a rotation angle interval of 30 to 150 degrees ATDC in the first cylinder #1 from a cylinder-specific rotation speed in a rotation angle interval of 30 to 150 degrees ATDC in the second cylinder #2.

Next, the CPU 72 calculates a determination value Oth and a determination result value JV using a determination function defined by determination function data 76b stored in the storage device 76 illustrated in FIG. 1. Unlike the mapping described above, the determination function is not trained (i.e., the determination function is not learned) by machine learning, and is created by experiments or simulation. Therefore, the processing load on the CPU 72 is smaller than that of the calculation process using the mapping data 76a. Specifically, the CPU 72 calculates the determination value Oth by applying the charging efficiency η to a map corresponding to a first determination function, and calculates the determination result value JV by substituting each rotational change value ΔNE and the determination value Oth into a second determination function (S32). The determination function data 76b defines a determination function that makes it possible to output a result of determination as to whether a misfire occurs in the cylinder #i in the periods corresponding to the infinitesimal rotation times T30(1) to T30(24) acquired through the process of S10. The determination function data 76b includes data serving as the first determination function for deriving the determination value Oth from the charging efficiency η, and data serving as the second determination function for deriving the determination result value JV from each rotational change value ΔNE and the determination value Oth. The determination value Oth is set larger at a high charging efficiency η than at a low charging efficiency η. This is because a decrease in the rotation speed due to a misfire is more significant at a high charging efficiency η than at a low charging efficiency η. In the map calculation, for example, when the value of an input variable matches the value of any input variable in the map, the value of a corresponding output variable may be set as a calculation result, and when there is no match, a value obtained by interpolation between the values of the output variable in the data set may be set as a calculation result.

Next, the CPU 72 substitutes each rotational change value ΔNE and the determination value Oth into the second determination function. The determination result value JV is calculated by a function that subtracts the determination value Oth from the rotational change value ΔNE. By comparing the rotational change value ΔNE and the determination value Oth, the CPU 72 determines whether each of the cylinders #1 to #4 is misfiring (S34). Specifically, when a determination result value JV(m) of a predetermined cylinder #m is smaller than "0", the CPU 72 determines that a rotational change value ΔNE(m) of the predetermined cylinder #m is smaller than the determination value Oth and the predetermined cylinder #m is misfiring (S34: YES). When the determination result values JV of all the cylinders are equal to or larger than "0", the CPU 72 determines that the rotational change value ΔNE is constantly equal to or larger than the determination value Oth and none of all the cylinders #1 to #4 are misfiring (S34: NO).

When the rotational change value ΔNE(m) is smaller than the determination value Oth (S34: YES), the CPU 72 increments a count N(m) of a misfire in the cylinder #m determined as misfiring (S36). The CPU 72 determines whether any one of the counts N(1) to N(4) is equal to or larger than the predetermined count Nth (S38). When the CPU 72 determines that any one of the counts N(1) to N(4) is equal to or larger than the predetermined count Nth (S38: YES), the CPU 72 determines that a misfire occurs in a specific cylinder #q (q is one of 1 to 4) at a frequency higher than that in the permissible range, and substitutes "1" into the failure flag F (S40). At this time, the CPU 72 stores information on the misfiring cylinder #q in the storage device 76, and retains the information at least until the misfire ceases in the cylinder #q.

When the rotational change value ΔNE is equal to or larger than the determination value Oth (S34: NO), the CPU 72 determines whether a predetermined period has elapsed from the process of S40 or a process of S44 described later (S42). The predetermined period is longer than the period of one combustion cycle, and may be 10 times or more as long as the period of one combustion cycle.

When the CPU 72 determines that the predetermined period has elapsed (S42: YES), the CPU 72 initializes the counts N(1) to N(4) and the failure flag F (S44). When the process of S40 or S44 is completed or when the determination result in the process of S38 or S42 is negative, the CPU 72 temporarily terminates the series of processes illustrated in FIG. 3.

Figure 4:
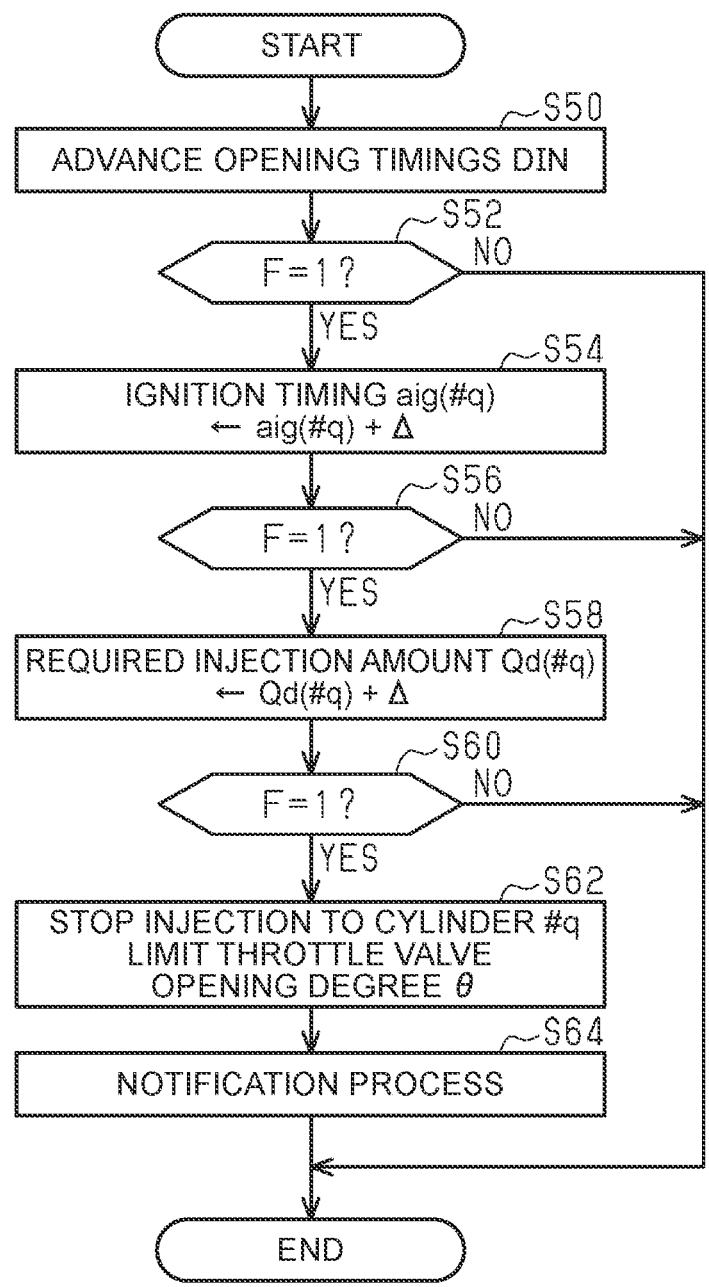
FIG. 4 is a flowchart illustrating a procedure of a misfire addressing process according to the first embodiment.

FIG. 4 illustrates a procedure of a process of addressing a misfire. The process illustrated in FIG. 4 is implemented when the CPU 72 executes an addressing program 74b stored in the ROM 74 illustrated in FIG. 1 when the failure flag F is switched from "0" to "1".

In a series of processes illustrated in FIG. 4, the CPU 72 first operates the intake valve timing changing device 40 by outputting the operation signal MS5 to the intake valve timing changing device 40 to advance an opening timing DIN of each intake valve 16 (S50). Specifically, in a normal state in which the failure flag F is "0", the CPU 72 variably sets the opening timing DIN depending on the operating point of the internal combustion engine 10. In the process of S50, the CPU 72 advances the actual opening timing DIN relative to the opening timing DIN in the normal state. The process of S50 is intended to stabilize combustion by increasing a compression ratio.

After the process of S50 is continued for the predetermined period or longer, the CPU 72 determines whether the failure flag F is "1" (S52). This process is intended to determine whether the situation that causes the misfire has been terminated through the process of S50. When the CPU 72 determines that the failure flag F is "1" (S52: YES), the CPU 72 operates the ignition device 22 of the misfiring cylinder #q by outputting the operation signal MS3 to the ignition device 22 to advance an ignition timing aig by a predetermined amount Δ (S54). This process is intended to terminate the situation that causes the misfire.

After the process of S54 is continued for the predetermined period or longer, the CPU 72 determines whether the failure flag F is "1" (S56). This process is intended to determine whether the situation that causes the misfire has been terminated through the process of S54. When the CPU 72 determines that the failure flag F is "1" (S56: YES), the CPU 72 operates the fuel injection valve 20 of the misfiring cylinder #q by outputting the operation signal MS2 to the fuel injection valve 20 so that the fuel injection valve 20 increases a required injection amount Qd by a predetermined amount (S58). The required injection amount Qd is an amount of fuel required in one combustion cycle. This process is intended to terminate the situation that causes the misfire.

After the process of S58 is continued for the predetermined period or longer, the CPU 72 determines whether the failure flag F is "1" (S60). This process is intended to determine whether the situation that causes the misfire has been terminated through the process of S58. When the CPU 72 determines that the failure flag F is "1" (S60: YES), the CPU 72 stops the fuel injection to the misfiring cylinder #q, and adjusts the operation signal MS1 to be output to the throttle valve 14 to operate the throttle valve 14 while limiting an opening degree 0 of the throttle valve 14 to a small degree (S62). The CPU 72 operates an alarm lamp 90 illustrated in FIG. 1 to execute a process of providing a notification that the misfire occurs (S64). The alarm lamp 90 functions as a notifier.

When the determination result in the process of S52, S56, or S60 is negative, that is, when the situation that causes the misfire is terminated, or when the process of S64 is completed, the CPU 72 temporarily terminates the series of processes illustrated in FIG. 4. When the determination result in the process of S60 is positive, the process of S62 is continued as a fail-safe process.

Figure 5:
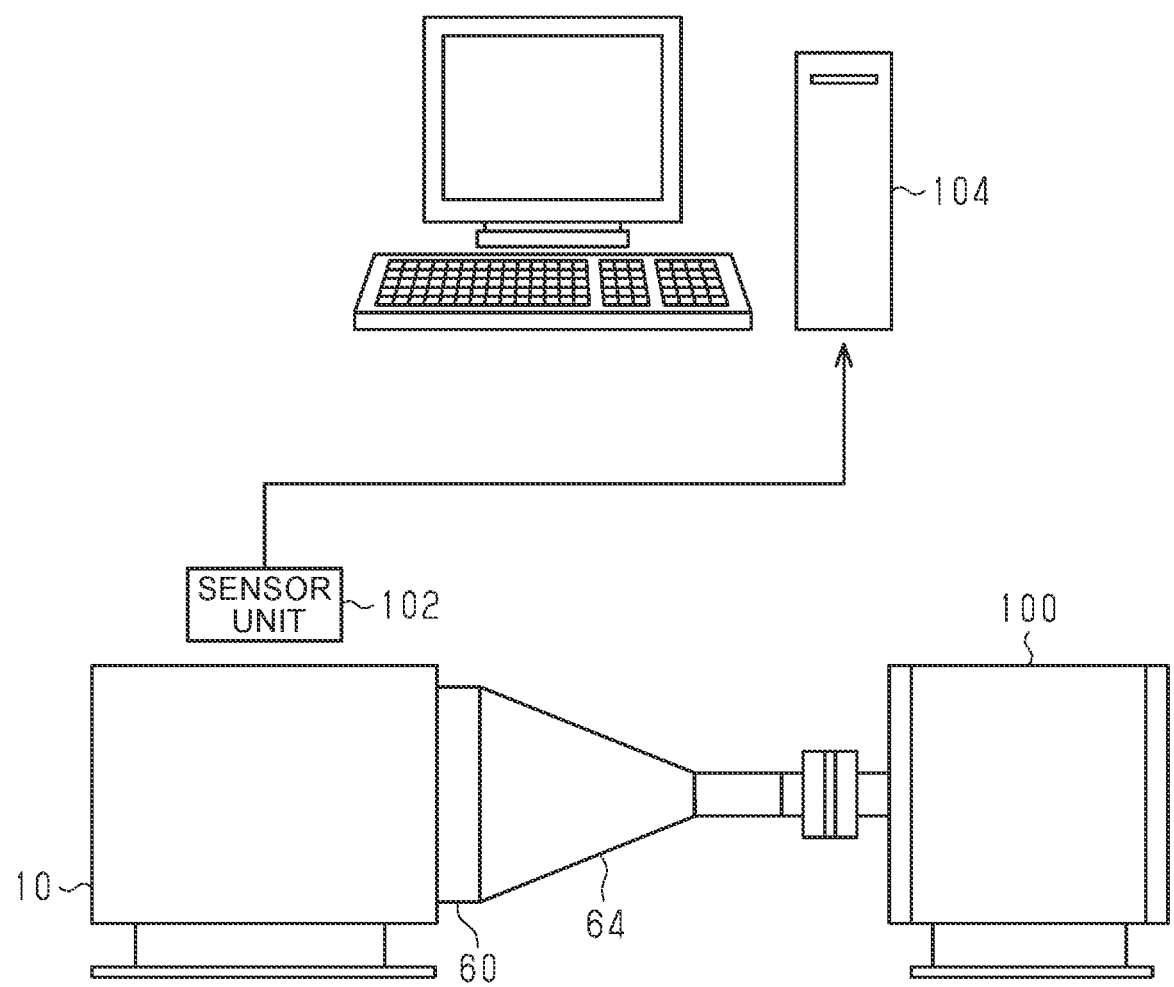
FIG. 5 is a diagram illustrating a system configured to generate mapping data according to the first embodiment.

Next, a method for generating the mapping data 76a is described. FIG. 5 illustrates a system configured to generate the mapping data 76a. As illustrated in FIG. 5, in this embodiment, a dynamometer 100 is mechanically coupled to the crankshaft 24 of the internal combustion engine 10 via the torque converter 60 and the transmission 64. A sensor unit 102 detects various state variables when the internal combustion engine 10 is operated, and detection results are input to an adaptation device 104, which is a computer configured to generate the mapping data 76a. The sensor unit 102 includes the crank angle sensor 80 and the airflow meter 82 configured to detect values for generating inputs to the mapping. The sensor unit 102 further includes, for example, cylinder pressure sensors to securely grasp whether a misfire occurs.

Figure 6:
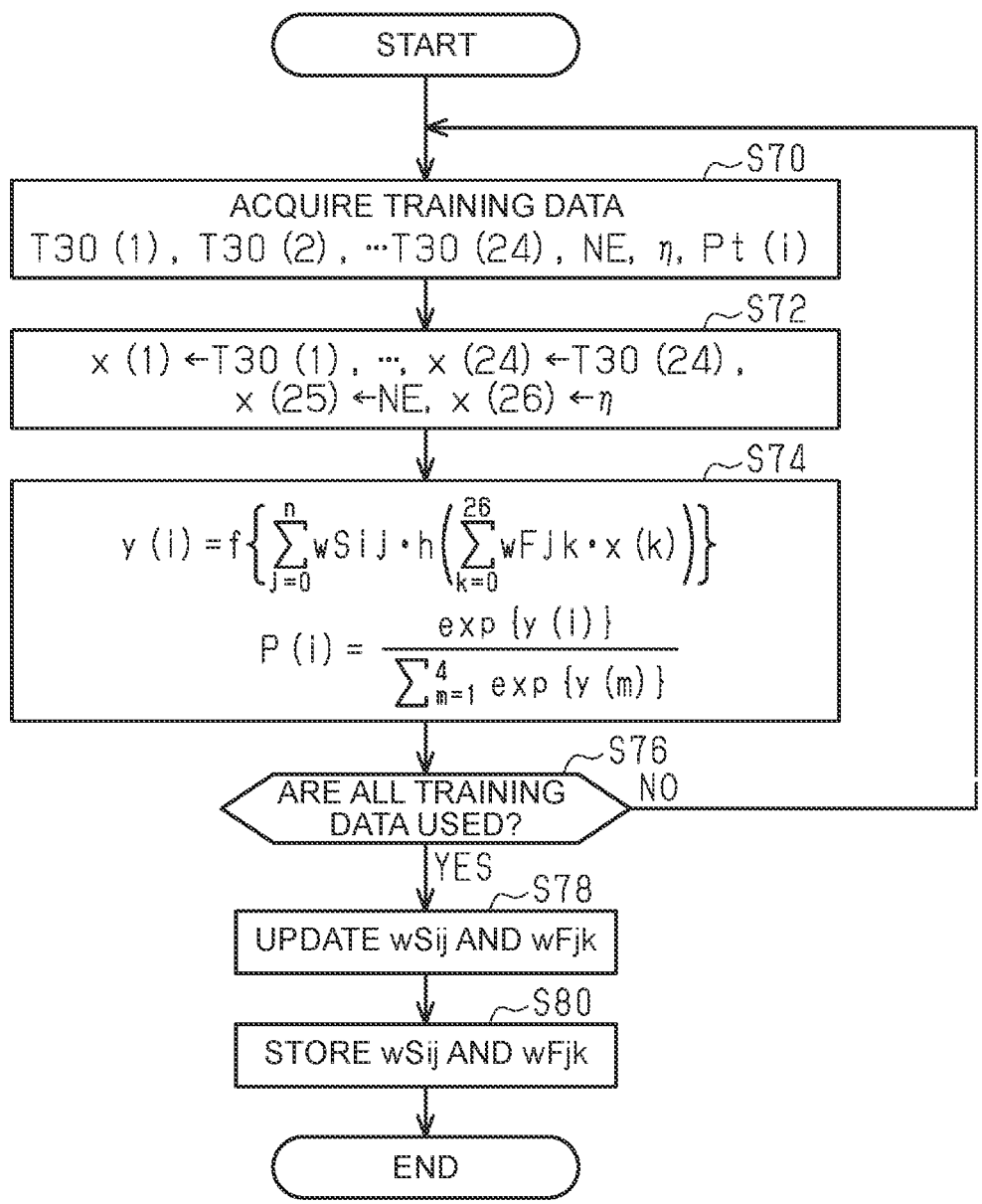
FIG. 6 is a flowchart illustrating a procedure of a mapping data learning process according to the first embodiment.

FIG. 6 illustrates a procedure of a mapping data generation process. The process illustrated in FIG. 6 is executed by the adaptation device 104. For example, the process illustrated in FIG. 6 may be implemented when a CPU of the adaptation device 104 executes a program stored in a ROM of the adaptation device 104.

In a series of processes illustrated in FIG. 6, the adaptation device 104 first acquires a plurality of sets of the infinitesimal rotation times T30(1) to T30(24), the rotation speed NE, the charging efficiency η, and a true probability Pt(i) of a misfire as training data determined based on the detection results from the sensor unit 102 (S70). The true probability Pt(i) is "1" when a misfire occurs, and is "0" when a misfire does not occur. The true probability Pt(i) is calculated based on, for example, detection values from the cylinder pressure sensors in the sensor unit 102. The detection values from the cylinder pressure sensors are parameters other than the parameters that define the input variables x(1) to x(26). To generate the training data, for example, the fuel injection to a predetermined cylinder is stopped intentionally to cause a phenomenon similar to the phenomenon in which a misfire occurs. In this case as well, the cylinder pressure sensor is used for detecting whether a misfire occurs in the cylinder to which fuel is injected.

Next, the adaptation device 104 substitutes, according to the procedure of the process of S14, data other than the true probability Pt(i) in the training data into the input variables x(1) to x(26) of the mapping for calculating the probability of a misfire (S72). Next, the adaptation device 104 calculates the probabilities P(1) to P(4) of a misfire in the cylinders #1 to #4 according to the procedure of the process of S16 (S74). The adaptation device 104 determines whether the processes of S70 to S74 are executed for all the training data detected by the sensor unit 102 (S76). When the adaptation device 104 determines that any training data has not undergone the processes of S70 to S74 (S76: NO), the adaptation device 104 proceeds to the process of S70, and executes the processes of S70 to S74 for the training data that has not undergone those processes.

When the adaptation device 104 determines that the processes of S70 to S74 are executed for all the training data detected by the sensor unit 102 (S76: YES), the adaptation device 104 updates the input-side coefficient wFjk and the output-side coefficient wSij so as to minimize cross entropy between the probability P(i) calculated through the process of S74 and the true probability Pt(i) (S78). The adaptation device 104 stores the updated input-side coefficient wFjk, the updated output-side coefficient wSij, and the like as trained mapping data (S80).

When the process of S80 is completed, the adaptation device 104 verifies the accuracy of the probability P(i) calculated by using the mapping defined by the input-side coefficient wFjk, the output-side coefficient wSij, and the like stored through the process of S80. When the accuracy falls out of a permissible range, the adaptation device 104 newly generates training data by operating the internal combustion engine 10, and repeats the processes of S70 to S80. When the accuracy falls within the permissible range, the adaptation device 104 sets the input-side coefficient wFjk, the output-side coefficient wSij, and the like as the mapping data 76a to be included in the control apparatus 70.

Actions and effects of this embodiment are described. (1) During the operation of the internal combustion engine 10, the CPU 72 sequentially calculates the infinitesimal rotation times T30. When the rotation speed NE is lower than the predetermined rotation speed NEth, the CPU 72 calculates the probabilities P(1) to P(4) of a misfire in the cylinders #1 to #4 by inputting the infinitesimal rotation times T30 corresponding to one combustion cycle to the mapping defined by the mapping data 76a. The infinitesimal rotation time T30 is a parameter indicating a rotation speed of the crankshaft 24 in an angle interval smaller than 180 degrees CA, which is the interval between the rotation angles at each of which the compression top dead center is reached. The infinitesimal rotation times T30 each corresponding to 30 degrees CA in one combustion cycle are input to the mapping. The values of the input-side coefficient wFjk and the output-side coefficient wSij to be used in the calculation for the infinitesimal rotation times T30 are obtained through training by the machine learning illustrated in FIG. 6. Therefore, the probability P(i) of a misfire can be calculated based on the rotational behavior of the crankshaft 24 on an infinitesimal timescale. As compared to a case where the determination as to whether a misfire occurs is made based on a difference between adjacent angle intervals in the time required for rotation in the angle interval substantially equal to the interval between the rotation angles at each of which the compression top dead center is reached, the determination as to whether a misfire occurs can be made based on further detailed information on the rotational behavior of the crankshaft 24. Thus, the misfire determination accuracy can be increased easily.

When the rotation speed NE is high, the CPU 72 calculates the probability P(i) more frequently per unit time. To calculate the probability P(i) using the mapping data 76a, the CPU 72 needs to process a large number of inputs that are the input variables x(1) to x(26). Therefore, when the rotation speed NE is high, the load on the CPU 72 is considerable as compared to, for example, the case where the determination as to whether a misfire occurs is made by using the determination function described above.

When the rotation speed NE is equal to or higher than the predetermined rotation speed NEth, the CPU 72 prohibits the calculation of the probabilities P(1) to P(4) of a misfire in the cylinders #1 to #4 based on the mapping data 76a. As compared to a case where the CPU 72 performs the calculation process using the mapping data 76a when the rotation speed NE is equal to or higher than the predetermined rotation speed NEth, the calculation load on the CPU 72 can be reduced.

(2) According to the embodiment described above, when the rotation speed NE is equal to or higher than the predetermined rotation speed NEth, the CPU 72 prohibits the calculation process using the mapping data 76a, and makes a misfire determination based on results of the map calculation. When the misfire determination is made based on the results of the map calculation, the load on the CPU 72 is smaller than that in the case where the misfire determination is made based on the results of the calculation using the mapping data 76a. Therefore, the misfire determination can be continued while reducing the load on the CPU 72 when the rotation speed NE is relatively high.

(3) The number of adaptation processes for generating the determination function is smaller in the case where the rotation speed NE is high than in the case where the rotation speed NE is low. According to the embodiment described above, the determination function is generated only within a range in which the rotation speed NE is relatively high. When the rotation speed NE is relatively low, the adaptation is performed by machine learning. Therefore, the number of adaptation processes for establishing a misfire determination logic can be reduced.

Second Embodiment

A second embodiment is described below with reference to the drawings, focusing on differences from the first embodiment.

Figure 7:
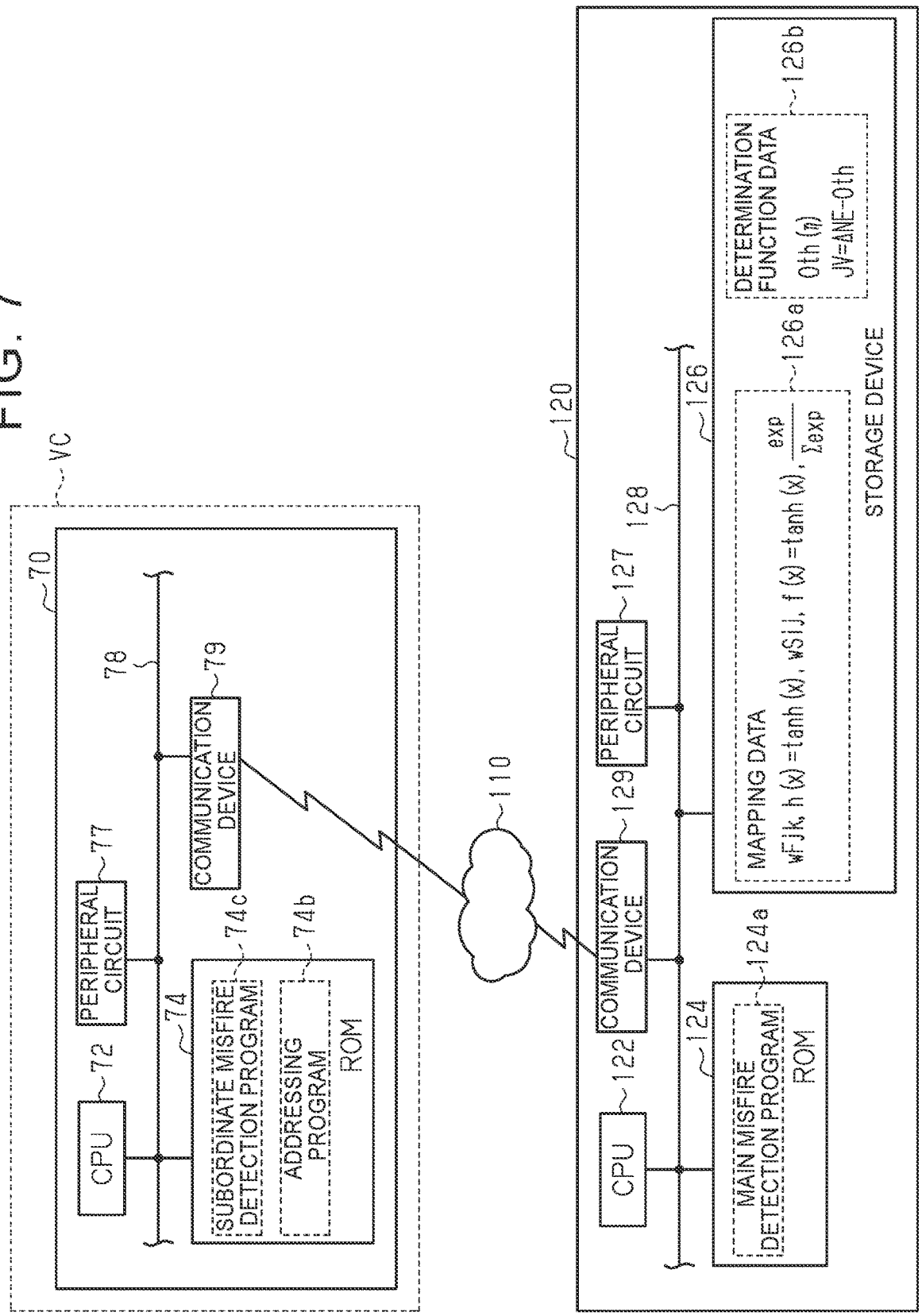
FIG. 7 is a diagram illustrating the configuration of a condition determination system according to a second embodiment.

In this embodiment, the misfire determination process is performed outside the vehicle. FIG. 7 illustrates an internal combustion engine condition determination system according to this embodiment. In FIG. 7, members corresponding to the members illustrated in FIG. 1 are represented by the same reference symbols for convenience.

The control apparatus 70 in the vehicle VC illustrated in FIG. 7 includes a communication device 79. The communication device 79 communicates with a center 120 via a network 110 outside the vehicle VC. The center 120 analyzes data transmitted from a plurality of vehicles VC. The center 120 includes a CPU 122, a ROM 124, a storage device 126, a peripheral circuit 127, and a communication device 129, which can communicate with each other via a local network 128. The ROM 124 stores a main misfire detection program 124a. The storage device 126 stores mapping data 126a. The mapping data 126a is identical to the mapping data 76a.

Figure 8:
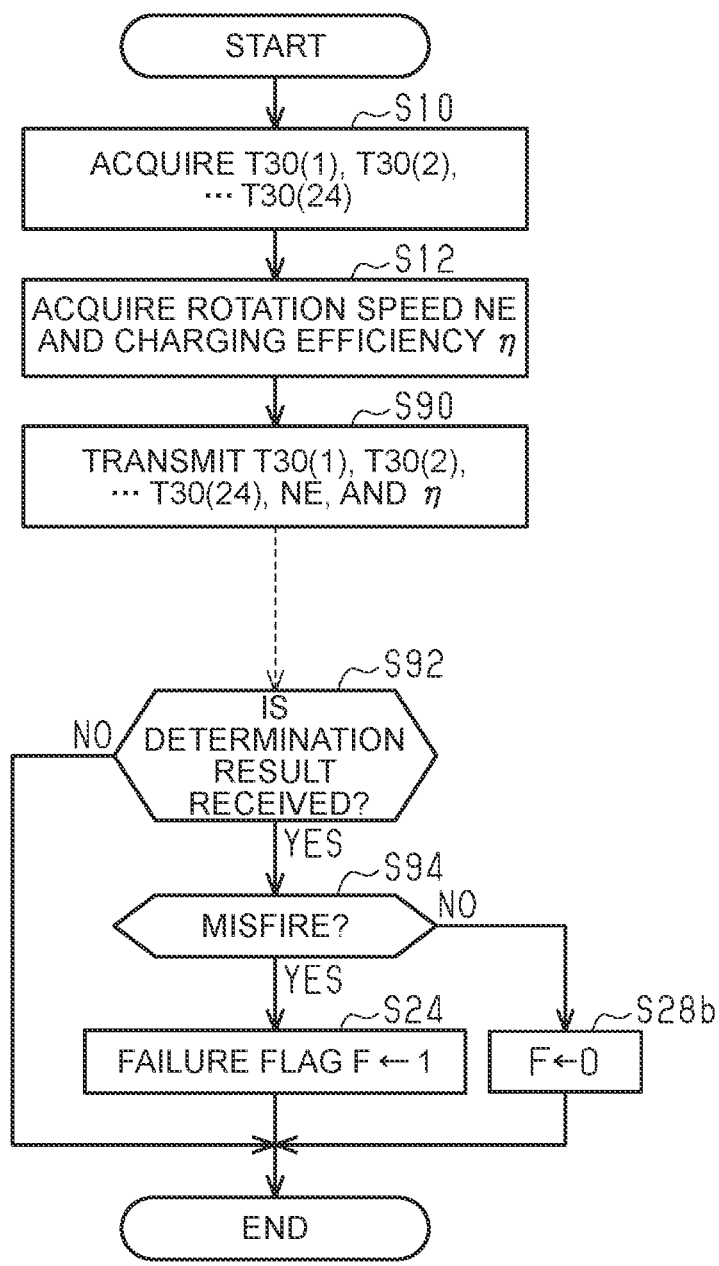
FIG. 8 is a flowchart illustrating a procedure of a determination process according to the second embodiment.
Figure 9:
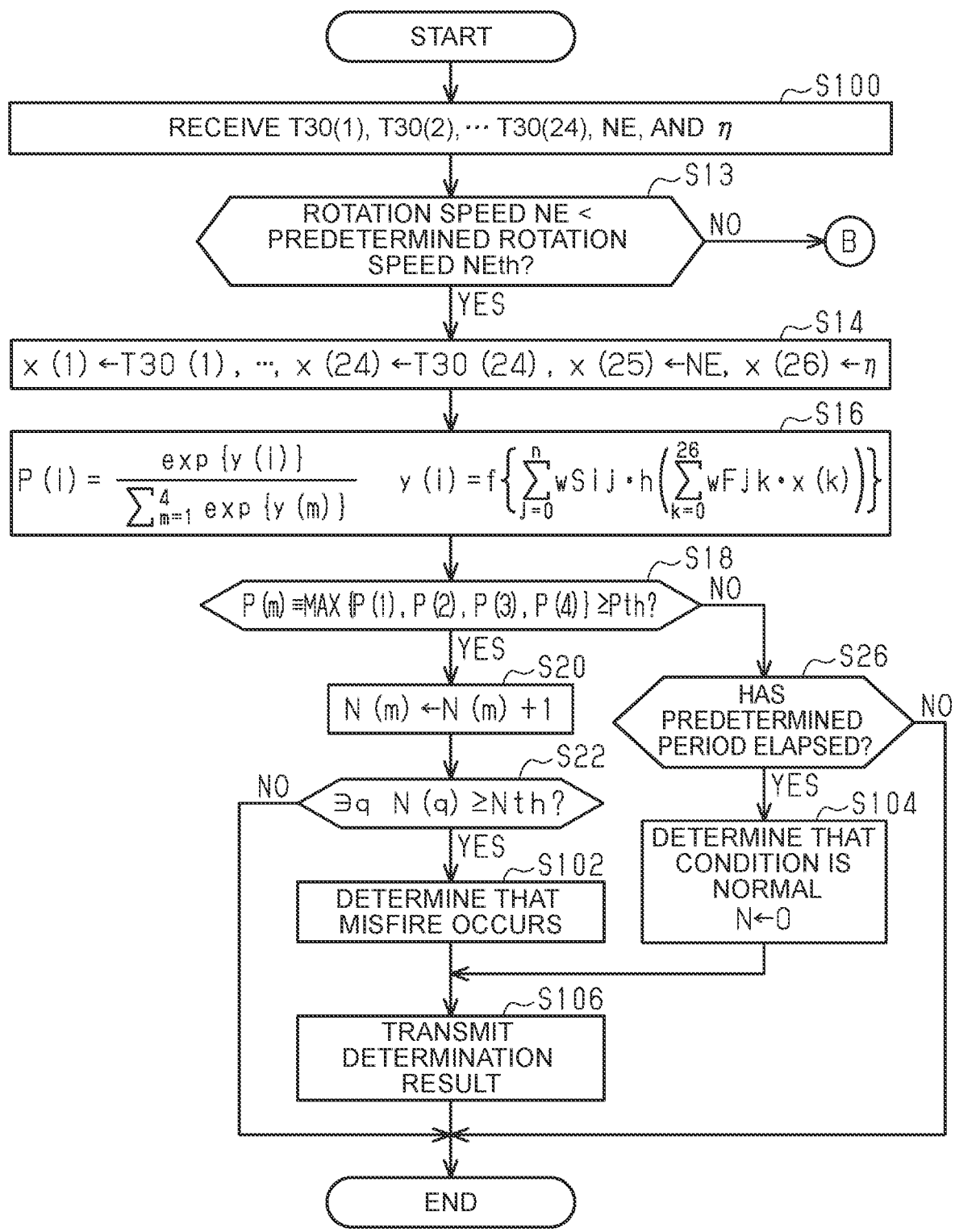
FIG. 9 is a flowchart illustrating the procedure of the determination process according to the second embodiment.

FIG. 8 illustrates a procedure of the misfire determination process according to this embodiment. The process illustrated in FIG. 8 is implemented when the CPU 72 executes a subordinate misfire detection program 74c stored in the ROM 74 illustrated in FIG. 7. A process illustrated in FIG. 9 is implemented when the CPU 122 executes the main misfire detection program 124a stored in the ROM 124. In FIG. 8 and FIG. 9, processes corresponding to the processes illustrated in FIG. 2 and FIG. 3 are represented by the same step numbers for convenience. The process illustrated in FIG. 8 is described below along the time sequence of the misfire detection process.

When the CPU 72 in the vehicle VC executes the processes of S10 and S12 illustrated in FIG. 8, the CPU 72 operates the communication device 79 to transmit data acquired through the processes of S10 and S12 to the center 120 together with identification information regarding the vehicle VC (S90). Then, the CPU 72 waits until a signal indicating a determination result is received from the center 120 as described later.

As illustrated in FIG. 9, the CPU 122 of the center 120 receives the transmitted data (S100), and determines whether the rotation speed NE is lower than the predetermined rotation speed NEth (S13). When the rotation speed NE is lower than the predetermined rotation speed NEth (S13: YES), the CPU 122 repeats the processes of S14 to S20 using the received data. When the CPU 122 determines that the count of a misfire in a specific cylinder is equal to or larger than a predetermined count Nth within a predetermined period in the same vehicle identified based on the identification information by repeating the processes of S14 to S20 (S22: YES), the CPU 122 determines that a misfire occurs (S102). When the count of a misfire in the specific cylinder is smaller than the predetermined count Nth though the processes of S14 to S20 are repeated over the predetermined period (S26: YES), the CPU 122 determines that the condition is normal, and initializes the counts N(1) to N(4) (S104). The predetermined period is set based on the timing of the determination that a misfire occurs or that the condition is normal.

When the process of S102 or S104 is completed, the CPU 122 operates the communication device 129 based on the identification information to transmit a signal indicating a determination result to the vehicle VC that transmits the data for the processes of S14 to S20 (S106). When the determination result shows that a misfire occurs, the information related to the determination result includes information related to the misfiring cylinder. When the process of S106 is completed or when the determination result in the process of S22 or S26 is negative, the CPU 122 temporarily terminates the series of processes illustrated in FIG. 9.

Figure 10:
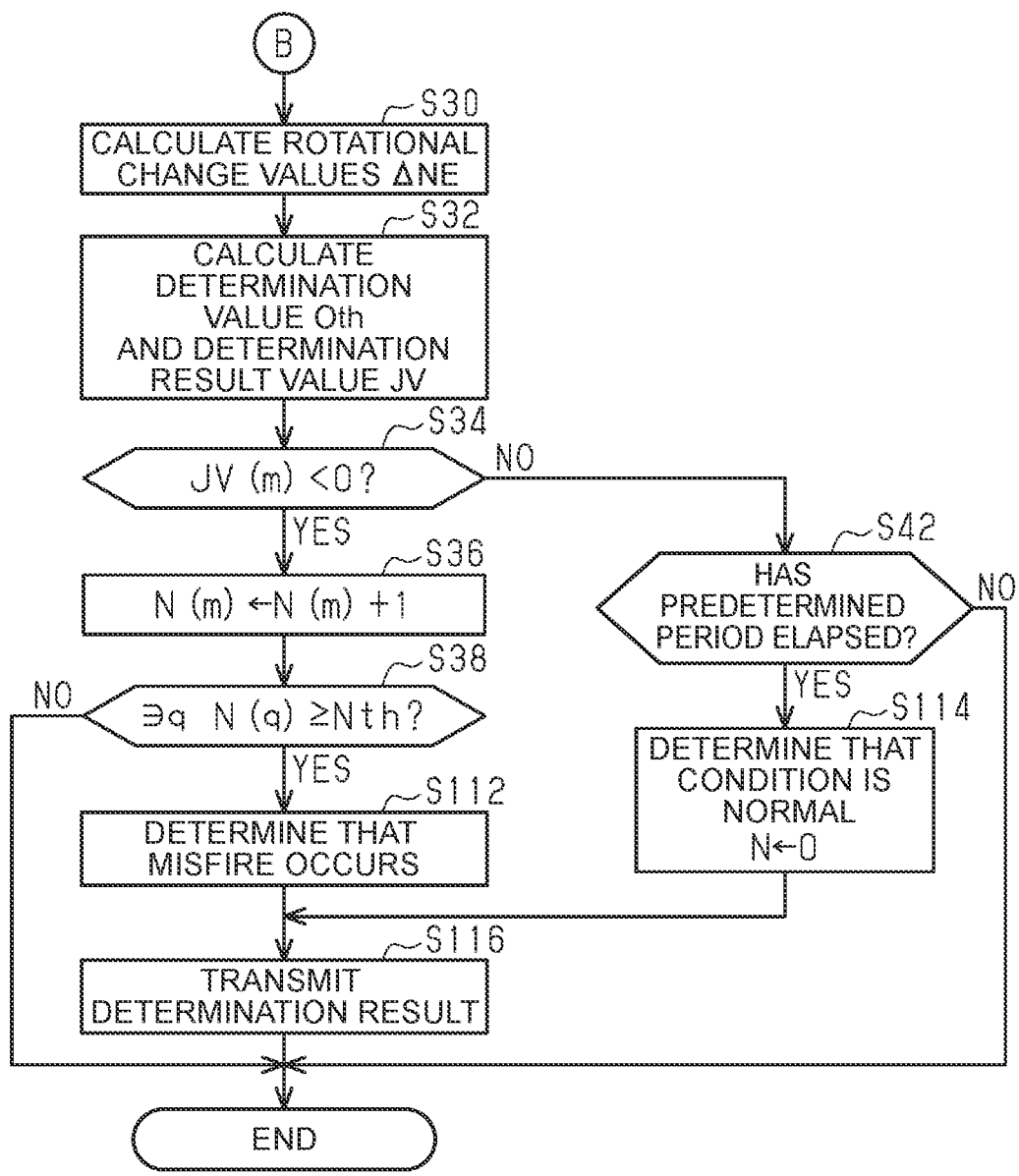
FIG. 10 is a flowchart illustrating the procedure of the determination process according to the second embodiment.

When the rotation speed NE is equal to or higher than the predetermined rotation speed NEth (S13: NO), the CPU 122 prohibits, as illustrated in FIG. 10, the processes of S14 to S20 using the received data, and repeats the processes of S30 to S36 using the received data. In the processes of S32 and S34, the CPU 122 calculates the determination value Oth and the determination result value JV by using a determination function defined by determination function data 126b stored in the storage device 126 illustrated in FIG. 7. When the CPU 122 determines that the count of a misfire in a specific cylinder is equal to or larger than the predetermined count Nth within a predetermined period in the same vehicle identified based on the identification information by repeating the processes of S30 to S36 (S38: YES), the CPU 122 determines that a misfire occurs (S112). When the count of a misfire in the specific cylinder is smaller than the predetermined count Nth though the processes of S30 to S36 are repeated over the predetermined period (S42: YES), the CPU 122 determines that the condition is normal, and initializes the counts N(1) to N(4) (S114). The predetermined period is set based on the timing of the determination that a misfire occurs or that the condition is normal.

When the process of S112 or S114 is completed, the CPU 122 operates the communication device 129 based on the identification information to transmit a signal indicating a determination result to the vehicle VC that transmits the data for the processes of S30 to S36 (S116). When the determination result shows that a misfire occurs, the information related to the determination result includes information related to the misfiring cylinder. When the process of S116 is completed or when the determination result in the process of S38 or S42 is negative, the CPU 122 temporarily terminates the series of processes illustrated in FIG. 10.

As illustrated in FIG. 8, when the CPU 72 in the vehicle VC receives the signal indicating the determination result from the center 120 (S92: YES), the CPU 72 determines whether the determination result shows that a misfire occurs (S94). When the determination result shows that a misfire occurs (S94: YES), the CPU 72 proceeds to the process of S24. When the determination result shows that a misfire does not occur (S94: NO), the CPU 72 initializes the failure flag F (S28b). When the process of S24 or S28b is completed or when the determination result in the process of S92 is negative, the CPU 72 temporarily terminates the process illustrated in FIG. 8.

Actions and effects of this embodiment are described. This embodiment attains the following effect in addition to the effects (1) to (3). (4) In the embodiment described above, the calculation load on the control apparatus 70 can be reduced by executing the misfire determination process in the center 120.

Third Embodiment

A third embodiment is described below with reference to the drawings, focusing on differences from the first embodiment.

The internal combustion engine condition determination apparatus of the first embodiment determines a misfire in the internal combustion engine 10 based on the rotational change of the crankshaft 24. Also in the event of a cylinder-to-cylinder air-fuel ratio imbalance in which variation in the air-fuel ratio occurs among the cylinders, variation in the combustion condition occurs among the cylinders, and the rotational change of the crankshaft 24 increases. An internal combustion engine condition determination apparatus of this embodiment determines the variation in the air-fuel ratio among the cylinders. The ROM 74 of the internal combustion engine condition determination apparatus of this embodiment stores a cylinder-to-cylinder air-fuel ratio imbalance detection program in place of the misfire detection program 74a illustrated in FIG. 1. The storage device 76 of the internal combustion engine condition determination apparatus of this embodiment stores, as the determination function data 76b, map data for calculating an imbalance ratio Riv by substituting an air-fuel ratio change value ΔAfu and the charging efficiency η. The imbalance ratio Riv is a value indicating the degree of variation among actual air-fuel ratios occurring when the fuel injection valves are operated so that the air-fuel ratios of the air-fuel mixtures in the plurality of cylinders are controlled to be equal to each other.

Figure 11:
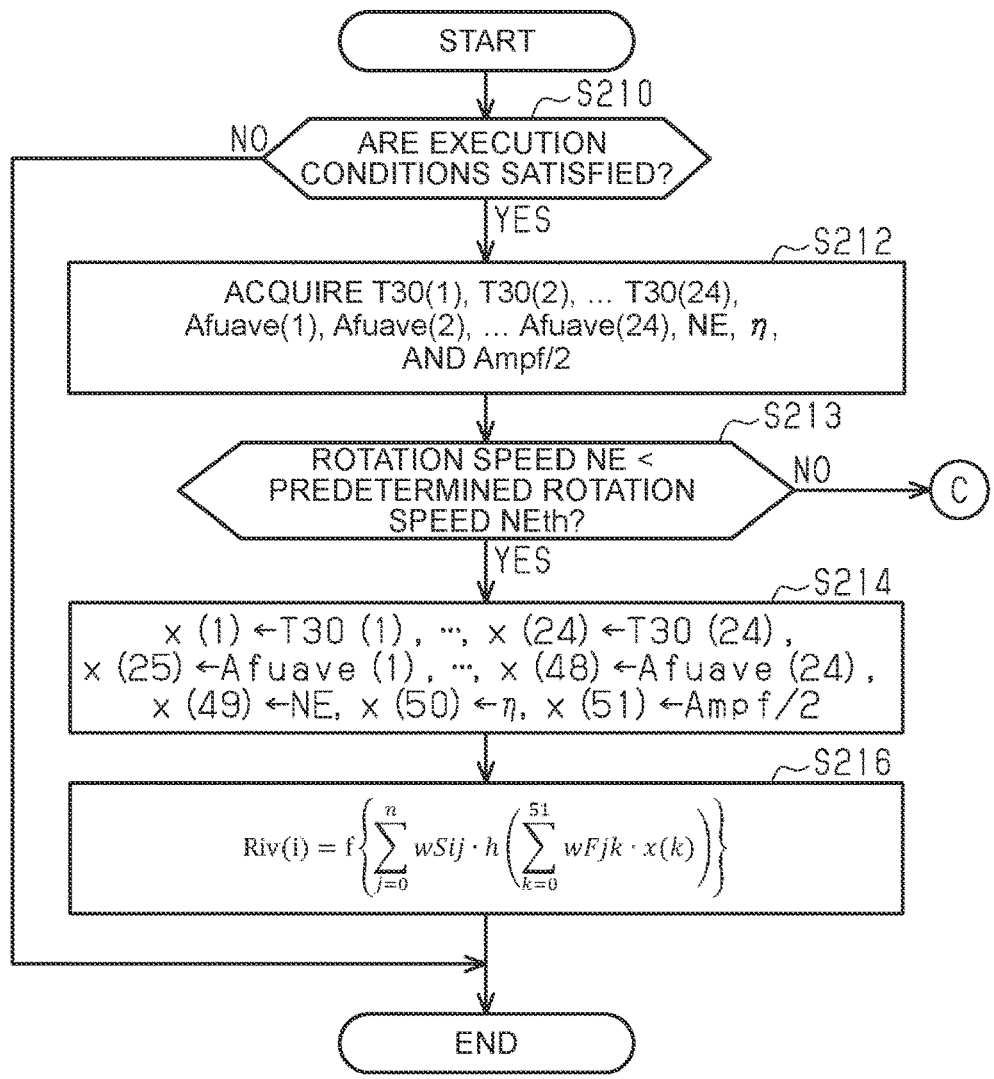
FIG. 11 is a flowchart illustrating a procedure of an imbalance determination process according to a third embodiment.

FIG. 11 illustrates a procedure of a process of detecting the cylinder-to-cylinder air-fuel ratio imbalance. The process illustrated in FIG. 11 is implemented when the CPU 72 repeatedly executes the imbalance detection program stored in the ROM 74 in every predetermined control period.

In a series of processes illustrated in FIG. 11, the CPU 72 first determines whether conditions for executing the imbalance detection process are satisfied (S210). The execution conditions include conditions that fuel vapor is not purged to intake air of the internal combustion engine 10 and that exhaust gas is not recirculated.

Next, the CPU 72 acquires the infinitesimal rotation times T30(1), T30(2), . . . T30(24), upstream-side averages Afuave(1), Afuave(2), . . . Afuave(24), the rotation speed NE, the charging efficiency and a 0.5th-order amplitude Ampf/2 (S212). The infinitesimal rotation time T30 is calculated by the CPU 72 by measuring a time required for the crankshaft 24 to rotate by 30 degrees CA based on the crank signal Scr that is the output signal of the crank angle sensor 80. If the parenthesized numerals of the infinitesimal rotation times are different like T30(1), T30(2), and the like, the parenthesized numerals indicate the different rotation angle intervals within 720 degrees CA corresponding to one combustion cycle. That is, the infinitesimal rotation times T30(1) to T30(24) indicate rotation times in angle intervals obtained by equally dividing the rotation angle range of 720 degrees CA by 30 degrees CA.

If m represents a value of 1 to 24, an upstream-side average Afuave(m) is an average of upstream-side detection values Afu in the same angle interval of 30 degrees CA as that of the infinitesimal rotation time T30(m).

The 0.5th-order amplitude Ampf/2 is the intensity of a 0.5th-order component of the rotational frequency of the crankshaft 24, and is calculated by the CPU 72 through Fourier transform of the time-series data of the infinitesimal rotation times T30.

Next, the CPU 72 determines whether the rotation speed NE is lower than the predetermined rotation speed NEth (S213). The predetermined rotation speed NEth is defined as a value at which a load of a calculation process using the mapping data 76a described later is relatively large as compared to the processing capability of the CPU 72. When the rotation speed NE is lower than the predetermined rotation speed NEth (S213: YES), the CPU 72 substitutes the values acquired through the process of S212 into input variables x(1) to x(51) of a mapping for outputting the imbalance ratio Riv (S214). Specifically, the CPU 72 defines "m=1 to 24", and substitutes the infinitesimal rotation time T30(m) into an input variable x(m), the upstream-side average Afuave(m) into an input variable (24+m), the rotation speed NE into the input variable x(49), the charging efficiency η into the input variable x(50), and the 0.5th-order amplitude Ampf/2 into the input variable x(51).

In this embodiment, the imbalance ratio Riv is "0" in a cylinder in which fuel is injected in a target injection amount, takes a positive value when the actual injection amount is larger than the target injection amount, and takes a negative value when the actual injection amount is smaller than the target injection amount. That is, the CPU 72 determines that the air-fuel ratio variation among the cylinders increases as the imbalance ratio Riv becomes apart from "0".

Next, the CPU 72 calculates imbalance ratios Riv(1) to Riv(4) of the cylinders #i (i=1 to 4) by inputting the input variables x(1) to x(51) to the mapping defined by the mapping data 76a stored in the storage device 76 illustrated in FIG. 1 (S216). The CPU 72 determines that the air-fuel ratio variation among the cylinders increases as the calculated imbalance ratios Riv become apart from "0".

In this embodiment, the mapping is constituted by a neural network having one intermediate layer. The neural network includes an input-side coefficient wFjk (j=0 to n, k=0 to 51) and an activation function h(x). The activation function h(x) is an input-side nonlinear mapping that nonlinearly converts outputs from an input-side linear mapping defined by the input-side coefficient wFjk. In this embodiment, a hyperbolic tangent "tanh(x)" is exemplified as the activation function h(x). The neural network further includes an output-side coefficient wSij (i=1 to 4, j=0 to n) and an activation function f(x). The activation function f(x) is an output-side nonlinear mapping that nonlinearly converts outputs from an output-side linear mapping defined by the output-side coefficient wSij. In this embodiment, a hyperbolic tangent "tanh(x)" is exemplified as the activation function f(x). The value n indicates a dimension of the intermediate layer.

Figure 12:
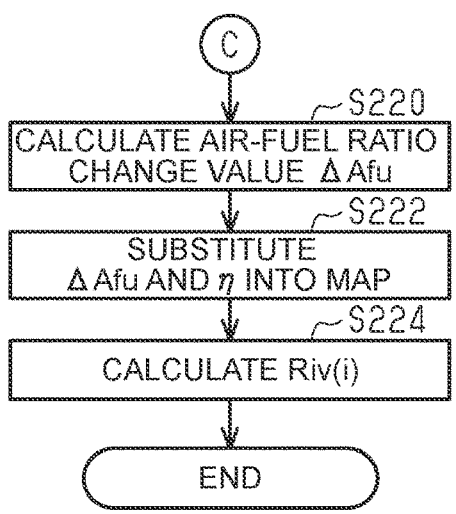
FIG. 12 is a flowchart illustrating the procedure of the imbalance determination process according to the third embodiment.

When the process of S216 is completed or when the determination result in the process of S210 is negative, the CPU 72 temporarily terminates the series of processes illustrated in FIG. 11. When the rotation speed NE is equal to or higher than the predetermined rotation speed NEth (S213: NO), the CPU 72 prohibits the process of calculating the imbalance ratios Riv(1) to Riv(4) of the cylinders #i (i=1 to 4) based on the mapping data 76a. As illustrated in FIG. 12, the CPU 72 calculates the imbalance ratios Riv using a determination function stored in the storage device 76.

In this embodiment, the imbalance ratio Riv indicating the degree of the air-fuel ratio variation among the cylinders is detected based on the air-fuel ratio change value ΔAfu correlated with the amount of change in the upstream-side detection value Afu.

Specifically, the CPU 72 first calculates the air-fuel ratio change value ΔAfu based on the upstream-side averages Afuave(1), Afuave(2), Afuave(24) (S220). The air-fuel ratio change value ΔAfu is a difference between a maximum value and a minimum value among the upstream-side averages Afuave(1), Afuave(2), Afuave(24).

Next, the CPU 72 calculates the imbalance ratio Riv using the determination function defined by the determination function data 76b stored in the storage device 76 illustrated in FIG. 1. Specifically, the CPU 72 substitutes the air-fuel ratio change value ΔAfu and the charging efficiency η into a map corresponding to the determination function (S222). The CPU 72 obtains the imbalance ratio Riv through map calculation using the determination function (S224). The imbalance ratio Riv is closer to "0" as the air-fuel ratio change value ΔAfu decreases, takes a positive value when the actual injection amount is larger than the target injection amount, and takes a negative value when the actual injection amount is smaller than the target injection amount. That is, the CPU 72 determines that the air-fuel ratio variation among the cylinders increases as the imbalance ratio Riv becomes apart from "0".

Figure 13:
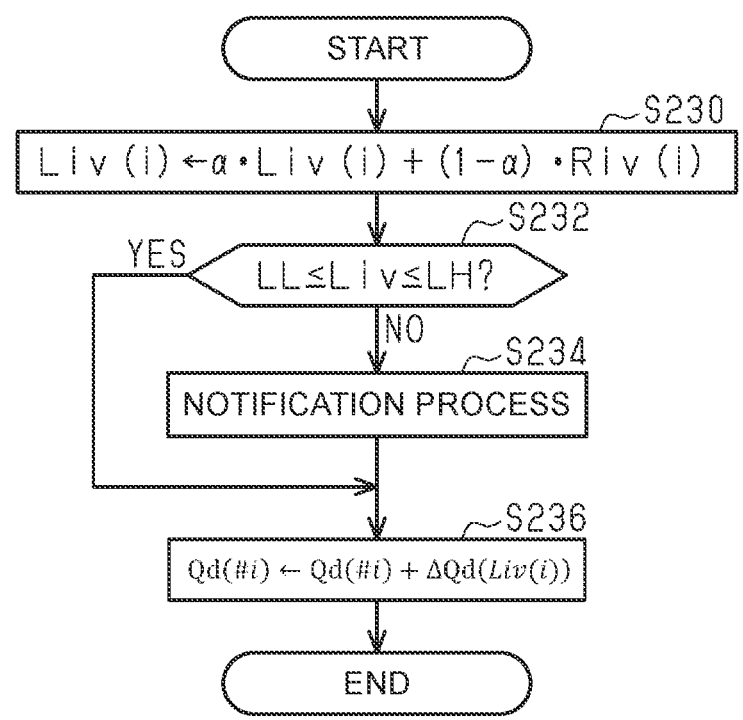
FIG. 13 is a flowchart illustrating a procedure of an addressing process according to the third embodiment.

FIG. 13 illustrates a procedure of a process using the imbalance ratio Riv(i). The process illustrated in FIG. 13 is implemented when the CPU 72 repeatedly executes the addressing program 74b stored in the ROM 74 illustrated in FIG. 1, for example, every time the imbalance ratio Riv(i) is calculated.

In a series of processes illustrated in FIG. 13, the CPU 72 first updates an imbalance learning value Liv(i) through an exponential moving average process using, as an input, the imbalance ratio Riv(i) newly calculated through the process of FIG. 11 (S230). That is, the CPU 72 updates the imbalance learning value Liv based on the sum of a value obtained by multiplying the imbalance learning value Liv(i) stored in, for example, the storage device 76 by a coefficient α and a value obtained by multiplying the imbalance ratio Riv(i) by "1−α" (S230), provided that "0<α<1" holds.

Next, the CPU 72 determines whether the imbalance learning value Liv(i) is equal to or larger than a lean-side permissible limit value LL and equal to or smaller than a rich-side permissible limit value LH (S232). When the CPU 72 determines that the imbalance learning value Liv(i) is smaller than the lean-side permissible limit value LL or larger than the rich-side permissible limit value (S232: NO), the CPU 72 operates the alarm lamp 90 to execute a notification process so as to prompt a user to perform repairing (S234).

When the CPU 72 determines that the imbalance learning value Liv(i) is equal to or larger than the lean-side permissible limit value LL and equal to or smaller than the rich-side permissible limit value LH (S232: YES) or when the process of S234 is completed, the CPU 72 corrects the required injection amount Qd(#i) of each cylinder (S236). That is, the CPU 72 corrects the required injection amount Qd(#i) of each cylinder by adding a correction amount ΔQd(Liv(i)) to the required injection amount Qd(#i) corresponding to the imbalance learning value Liv(i). The correction amount ΔQd(Liv(i)) takes a negative value when the imbalance learning value Liv(i) is larger than "0", and takes a positive value when the imbalance learning value Liv(i) is smaller than "0". When the imbalance learning value Liv(i) is "0", the correction amount ΔQd(Liv(i)) is also "0".

When the process of S236 is completed, the CPU 72 temporarily terminates the series of processes illustrated in FIG. 13. In this embodiment, when the determination result in the process of S210 is positive and the process of S212 is executed, the process of S236 is stopped temporarily.

For example, the mapping data 76a of this embodiment is generated as follows. First, there are prepared a plurality of fuel injection valves 20 whose imbalance ratios Riv take various values other than "0 (zero)" and three fuel injection valves 20 whose imbalance ratios are "0", through individual measurements conducted in advance. An internal combustion engine 10 to which the torque converter 60 is coupled and which includes the three fuel injection valves 20 whose imbalance ratios are "0" and one fuel injection valve 20 whose imbalance ratio is different from "0" is operated on a test bench in a state in which a dynamometer is connected to an output shaft of the torque converter 60. Imbalance ratios Rivt of the mounted fuel injection valves 20 are training data (teaching data).

The values of the imbalance ratios Rivt are calculated through processes similar to the processes of S214 and S216, using the values of the rotation waveform variable and the variables acquired through the process of S212. Learning is executed on the values of the input-side coefficient wFjk and the output-side coefficient wSij so as to reduce differences between the values of the calculated imbalance ratios Rivt and the training data (teaching data). Specifically, learning may be executed on the values of the input-side coefficient wFjk and the output-side coefficient wSij so as to minimize cross entropy. The rotation speed of the input shaft 66 of the transmission 64 may be simulated based on the rotation speed of the dynamometer.

Actions and effects of this embodiment are described. (5) According to the embodiment described above, in the determination regarding the variation in the air-fuel ratio among the plurality of cylinders, the CPU 72 prohibits the calculation of the probabilities P(1) to P(4) of a misfire in the cylinders #1 to #4 based on the mapping data 76a when the rotation speed NE is equal to or higher than the predetermined rotation speed NEth. As compared to the case where the CPU 72 performs the calculation process using the mapping data 76a when the rotation speed NE is equal to or higher than the predetermined rotation speed NEth, the calculation load on the CPU 72 can be reduced.

[1] A condition determination apparatus may correspond to the control apparatus 70. An execution device may correspond to the CPU 72 and the ROM 74 in the first and third embodiments, and the CPUs 72 and 122 and the ROMs 74 and 124 in the second embodiment. A storage device may correspond to the storage device 76 in the first and third embodiments, and the storage device 126 in the second embodiment. An internal combustion engine state variable may correspond to the infinitesimal rotation times T30(1), T30(2), . . . T30(24) in the first and second embodiments, and the upstream-side averages Afuave(1), Afuave(2), Afuave(24) in the third embodiment. A "determination process of determining the condition of the internal combustion engine based on the output obtained through the mapping using the internal combustion engine state variable as the input" may correspond to the processes of S13 to S28 of FIG. 2, and the processes of S213 to S216 of FIG. 11. A threshold may correspond to the predetermined rotation speed NEth. [2] A "determination process of determining the condition of the internal combustion engine using the determination function" may correspond to the processes of S30 to S44 of FIG. 3, the processes of S30 to S114 of FIG. 10, and the processes of S220 to S224 of FIG. 12. [3] A first interval may correspond to 720 degrees CA. A second interval may correspond to 30 degrees CA. An instantaneous speed parameter may correspond to the infinitesimal rotation time T30. An acquisition process may correspond to the process of S10. An addressing process may correspond to the process of FIG. 4. Predetermined hardware may correspond to the intake valve timing changing device 40, the ignition device 22, the fuel injection valve 20, and the throttle valve 14. [4] A rotation waveform variable may correspond to the infinitesimal rotation times T30(1), T30(2), . . . T30(24). A third interval may correspond to 30 degrees CA. A fourth interval may correspond to 30 degrees CA. An addressing process may correspond to the process of FIG. 13. Predetermined hardware may correspond to the alarm lamp 90 and the fuel injection valve 20. [5] A first execution device may correspond to the CPU 72 and the ROM 74. A second execution device may correspond to the CPU 122 and the ROM 124. A vehicle-side transmission process may correspond to the process of S90 of FIG. 8. An external reception process may correspond to the process of S100 of FIG. 9. A "signal based on an output calculated through an output calculation process" may correspond to the signal indicating the determination result. [6] A data analyzing apparatus may correspond to the center 120. [7] An internal combustion engine control apparatus may correspond to the control apparatus 70 illustrated in FIG. 7.

The embodiments may be modified as follows. The embodiments and the following modified examples may be combined without causing any technical contradiction.

The internal combustion engine state variable is described. In the embodiments described above, the internal combustion engine state variable to be input to the mapping is not limited to the examples in the embodiments. For example, the instantaneous speed parameter in the first and second embodiments is not limited to the infinitesimal rotation time, which is required for rotation in the second interval. For example, the instantaneous speed parameter may be a value obtained by dividing the second interval by the infinitesimal rotation time. The instantaneous speed parameter need not necessarily be obtained through the normalization process in which the difference between the local maximum value and the local minimum value is a fixed value. The filtering serving as the pre-process of obtaining the input to the mapping is not limited to the filtering described above. For example, the process may involve eliminating influence of rotation of the crankshaft 24 by the input shaft 66 of the transmission 64 based on infinitesimal rotation times of the input shaft 66. The instantaneous speed parameter to be input to the mapping need not necessarily be subjected to the filtering. The same applies to the rotation waveform variable in the third embodiment. The internal combustion engine state variable is not particularly limited as long as the internal combustion engine state variable is a parameter indicating the condition of the internal combustion engine.

The determination function is described. In the embodiments described above, the structure of the determination function is not limited to the examples of the embodiments. For example, in the first embodiment, the determination function may be a map that derives the determination value Oth by substituting the rotation speed NE and the charging efficiency η. In the first embodiment, the rotational change value ΔNE and the determination value Oth may be compared based on a ratio instead of the difference.

The determination process using the determination function is described. In the embodiments described above, the determination using the determination function may be omitted. In this case, the execution device may prohibit the determination process of determining whether a misfire occurs or determining the air-fuel ratio variation among the cylinders when the rotation speed NE of the crankshaft 24 is equal to or higher than the predetermined rotation speed NEth.

The first interval and the second interval are described. In the first and second embodiments, the infinitesimal rotation time T30 serving as the instantaneous speed parameter in each of the plurality of successive second intervals within the rotation angle interval of 720 degrees CA corresponding to one combustion cycle is set as the parameter to be input to the mapping for the determination as to whether a misfire occurs. That is, description is provided on the example in which the first interval is 720 degrees CA and the second interval is 30 degrees CA. The first interval and the second interval are not limited to those in this example. For example, the first interval may be a rotation angle interval larger than 720 degrees CA. Further, the first interval need not necessarily be equal to or larger than 720 degrees CA. The first interval may be an angle interval equal to or smaller than 720 degrees CA, such as 480 degrees CA, with regard to an input to a mapping that makes it possible to output data related to a probability of a misfire or a generated torque in a specific cylinder. At this time, the first interval may be a rotation angle interval larger than the interval between the rotation angles at each of which the compression top dead center is reached. The first interval includes a compression top dead center of a cylinder for which the probability of a misfire is determined.

The second interval is not limited to 30 degrees CA. The second interval may be an angle interval smaller than 30 degrees CA, such as 10 degrees CA. The second interval is not limited to the angle interval equal to or smaller than 30 degrees CA, and may be, for example, 45 degrees CA.

The parameters for defining the operating point of the internal combustion engine are described. In the first and second embodiments, the rotation speed NE and the charging efficiency η define the operating point, but the parameters are not limited to the rotation speed NE and the charging efficiency η. For example, the parameters may be the rotation speed NE and the intake amount Ga. For example, an injection amount or a required torque of the internal combustion engine may be used as a load in place of the charging efficiency η. The use of the injection amount or the required torque as the load is particularly effective in a compression-ignition internal combustion engine.

The third interval and the fourth interval are described. In the third embodiment, the third interval, which is a sampling interval for the upstream-side average Afuave to be input to the mapping, is not limited to 30 degrees CA. The third interval may be an angle interval smaller than 30 degrees CA, such as 10 degrees CA. The third interval is not limited to the angle interval equal to or smaller than 30 degrees CA, but may be, for example, 45 degrees CA.

The fourth interval, which is a sampling interval for the infinitesimal rotation time T30 to be input to the mapping, is not limited to 30 degrees CA. The fourth interval may be an angle interval smaller than 30 degrees CA, such as 10 degrees CA. The fourth interval is not limited to the angle interval equal to or smaller than 30 degrees CA, and may be, for example, 45 degrees CA. The third interval and the fourth interval need not necessarily be equal to each other.

The inputs to the mapping are described. In the first and second embodiments, the inputs to the mapping together with the instantaneous speed parameter are not limited to the examples of the embodiments. Examples of the inputs may include a parameter for adjusting the combustion rate of the air-fuel mixture in the combustion chamber 18 of the internal combustion engine 10, and a state variable of a road where the vehicle VC including the internal combustion engine 10 is traveling. The inputs to the mapping need not necessarily include the operating point of the internal combustion engine 10. For example, the inputs need not include the operating point when the internal combustion engine is mounted on a series hybrid vehicle and control is performed under the assumption that the operating point is limited to a narrow range. The input to the mapping together with the instantaneous speed parameter may be only one out of two parameters such as the load and the rotation speed NE for defining the operating point, or the intake amount and the rotation speed NE.

Also in the third embodiment, the inputs to the mapping together with the rotation waveform variable and the plurality of values of the air-fuel ratio detection variable are not limited to the examples of the embodiment. Further, the inputs to the mapping need not necessarily include the operating point of the internal combustion engine 10.

For example, in the embodiments described above, a subset of the plurality of kinds of physical quantity to be input to the detection mapping need not directly be input to the neural network or a recurrent neural network. Instead, several main components obtained through a main component analysis for the physical quantities may directly be input to the neural network or the recurrent neural network. When the main components are input to the neural network or the recurrent neural network, the main components need not necessarily be a part of the input to the neural network or the recurrent neural network, and may be the entire input. When the main components are input to the detection mapping, the mapping data 76a or 126a includes data defining the detection mapping that specifies the main components.

The internal combustion engine condition determination system is described. In the third embodiment, the internal combustion engine condition determination system may be configured as in the second embodiment to perform the process of detecting the cylinder-to-cylinder air-fuel ratio imbalance. In this case, the center 120 may calculate the imbalance ratios Riv, and transmit the calculated imbalance ratios Riv to the vehicle VC.

The addressing process is described. In the embodiments described above, the details of the addressing process are not limited to the examples of the embodiments. For example, the alarm lamp 90 is operated to provide a notification that a misfire occurs through visual information, but the notification is not limited to this example. For example, a loudspeaker may be operated to provide a notification that a misfire occurs through audio information. For example, the control apparatus 70 illustrated in FIG. 1 may include the communication device 129 and transmit, to a user's mobile terminal, a signal indicating that a misfire occurs by operating the communication device 129. This process can be implemented by installing, in the user's mobile terminal, an application program for executing the notification process. In the first embodiment, the addressing process illustrated in FIG. 4 may be omitted in part or entirely. The same applies to the addressing process of the air-fuel ratio variation among the cylinders.

The mapping data is described. In the embodiments described above, the activation functions h, h1, h2, . . . hα are the hyperbolic tangents, and the output activation function is the softmax function, but the mapping data is not limited to those functions. For example, the activation functions h, h1, h2, . . . hα may be rectified linear units (ReLUs). For example, the output activation function may be a logistic sigmoid function. In this case, for example, the number of nodes in an output layer may be set to one and the output variable may be a combustion state variable PR. A determination is made that there is an abnormality when the value of the output variable is equal to or larger than a predetermined value. Thus, a determination as to whether there is an abnormality can be made.

The algorithm of the machine learning is described. The algorithm of the machine learning is not limited to the algorithm using the neural network. For example, a recurrent neural network may be used. The recurrent neural network corresponds to the neural network without the intermediate layer. For example, a support vector machine may be used. In this case, the magnitude of an output value has no meaning, and whether a misfire occurs is determined based on whether the output value is positive. In other words, this case differs from a case where the combustion state variable has three or more values and the magnitudes of the values represent the magnitudes of the probability of a misfire.

The method for generating the mapping data is described. In the first and second embodiments, learning is executed in a situation in which a misfire occurs randomly, but the learning is not limited to this case. For example, learning may be executed in a situation in which a misfire occurs continuously in a specific cylinder. In this case, a cylinder-to-cylinder variable to be input to the mapping or a cylinder-to-cylinder variable to be used for a change pattern variable may be a difference between the infinitesimal rotation times T30 corresponding to the compression top dead centers of the cylinder subjected to misfire detection and the other cylinders.

In the embodiments described above, the method for generating the mapping data is not limited to the method involving the learning based on the rotational behavior of the crankshaft 24 when the dynamometer is connected to the crankshaft 24 and the internal combustion engine 10 is operated. For example, learning may be executed based on the rotational behavior of the crankshaft 24 when the internal combustion engine 10 is mounted on the vehicle and the vehicle is caused to travel. Thus, the learning reflects influence on the rotational behavior of the crankshaft 24 from the condition of a road where the vehicle travels.

The data analyzing apparatus is described. In the second embodiment, the process of FIG. 9 may be executed by, for example, the user's mobile terminal. The process can be implemented by installing, in the mobile terminal, an application program for executing the process of FIG. 9. At this time, the process of transmitting and receiving the vehicle ID may be omitted by, for example, setting an effective data transmission distance in the process of S106 to the length of the vehicle.

The execution device is described. In the embodiments described above, the execution device is not limited to the device that includes the CPU 72 and/or 122 and the ROM 74 and/or 124 and executes the software process. For example, the execution device may include a dedicated hardware circuit (for example, an application-specific integrated circuit (ASIC)) configured to execute a hardware process in place of at least a part of the software process in the embodiments. That is, the execution device may have one of the following structures (a) to (c). (a) The execution device includes a processing device configured to execute all the processes described above based on programs, and a program storage device such as a ROM that stores the programs. (b) The execution device includes a processing device configured to execute a part of the processes described above based on programs, a program storage device, and a dedicated hardware circuit configured to execute the remaining processes. (c) The execution device includes a dedicated hardware circuit configured to execute all the processes described above. A plurality of devices or circuits may be provided as the software execution device including the processing device and the program storage device or as the dedicated hardware circuit.

The storage device is described. In the first and second embodiments, the storage device that stores the mapping data 76a or 126a is provided separately from the ROM 74 or 124 serving as the storage device that stores the misfire detection program 74a or the main misfire detection program 124a. The storage device is not limited to those storage devices. The same applies to the storage device that stores the mapping data 76a and the storage device that stores the imbalance detection program in the third embodiment.

The computer is described. The computer is not limited to the computer including the execution device including the CPU 72 and the ROM 74 and mounted on the vehicle, and the execution device including the CPU 122 and the ROM 124 and provided in the center 120. For example, the computer may include the execution device mounted on the vehicle, the execution device provided in the center 120, and the execution device including a CPU and a ROM and provided in the user's mobile terminal. For example, this computer can be implemented when data is transmitted to the user's mobile terminal in the process of S90 of FIG. 8 and the mobile terminal executes the processes of S13 to S26 and S100 to S106 of FIG. 9.

The condition of the internal combustion engine is described. The condition of the internal combustion engine 10 to be determined through the determination process may differ from the misfire and the cylinder-to-cylinder air-fuel ratio imbalance as long as the acquisition process is executed every time the crankshaft 24 rotates by a predetermined angle. For example, in the event of a so-called compression loss in a specific cylinder, variation in the combustion condition occurs among the cylinders, and the rotational change of the crankshaft 24 increases. The compression loss is insufficient compression of intake air in a cylinder due to sticking of the intake valve or the exhaust valve in an open state. Therefore, the compression loss may detected based on a mapping using the internal combustion engine state variable as an input. In this case, the compression loss can be determined while reflecting influence on the rotational behavior of the crankshaft 24.

Combinations of the embodiments are described. Both the misfire detection program 74a in the first and second embodiments and the imbalance detection program in the third embodiment may be installed, and the CPU 72 may determine both the misfire and the cylinder-to-cylinder air-fuel ratio imbalance. In this case, the calculation load on the CPU 72 is larger than that in the case where the CPU 72 determines the misfire or the cylinder-to-cylinder air-fuel ratio imbalance. Therefore, great effects can be attained by applying the embodiments when the rotation speed NE of the crankshaft 24 is relatively high.

The first and second embodiments may be combined to such that the misfire is determined in the vehicle VC and the misfire is also determined in the center 120. The second and third embodiments may be combined such that the misfire is determined in the center 120 and the cylinder-to-cylinder air-fuel ratio imbalance is determined in the vehicle VC.

The center is described. In the second embodiment, the center 120 need not transmit the misfire determination result to the vehicle VC. In this case, the center 120 stores the determination result, which can be used for research and development.

The internal combustion engine is described. In the embodiments described above, a direct injection valve configured to inject fuel into the combustion chamber 18 is exemplified as the fuel injection valve, but the fuel injection valve is not limited to the direct injection valve. For example, the fuel injection valve may be a port injection valve configured to inject fuel into the intake passage 12. For example, both the port injection valve and the direct injection valve may be provided. The internal combustion engine is not limited to a spark-ignition internal combustion engine. For example, the internal combustion engine may be a compression-ignition internal combustion engine using light oil as the fuel.

The vehicle is described. The vehicle VC of the embodiments described above includes the lock-up clutch 62, the torque converter 60, and the transmission 64 in the drive system, but may be a vehicle having a different structure in the drive system.

What is claimed is:

1. An internal combustion engine condition determination apparatus comprising:
   a storage device; and
   an execution device, wherein:
   the storage device stores mapping data that defines a mapping between an input and an output, the input being an internal combustion engine state variable, the output being a determination result related to a condition of an internal combustion engine, the internal combustion engine state variable being a parameter indicating the condition of the internal combustion engine;
   the execution device is configured to execute
      an acquisition process of acquiring the internal combustion engine state variable every time a crankshaft of the internal combustion engine rotates by a predetermined angle, and
      a first determination process of determining the condition of the internal combustion engine based on the output obtained through the mapping using the internal combustion engine state variable as the input;
   the mapping data is trained by machine learning;
   the execution device is configured to prohibit the first determination process when a rotation speed of the crankshaft is equal to or higher than a predetermined threshold;
   the storage device stores a determination function, and the determination result is obtained by substituting at least one of the internal combustion engine state variable and a variable derived from the internal combustion engine state variable into the determination function; and
   the execution device is configured to execute, when the rotation speed of the crankshaft is equal to or higher than the predetermined threshold, a second determination process of determining the condition of the internal combustion engine using the determination function, the second determination process being a process in which a calculation load is smaller than the first determination process and the determination function is not learned by machine learning.

2. The internal combustion engine condition determination apparatus according to claim 1, wherein:
the condition of the internal combustion engine is whether a misfire occurs in the internal combustion engine;
the execution device is configured to execute, when a determination is made through the first determination process that the misfire occurs, an addressing process of addressing the misfire by operating predetermined hardware;
the mapping data defines the mapping between the input that is time-series data including an instantaneous speed parameter in each of a plurality of successive second intervals within a first interval, and the output that is a probability of the misfire in the internal combustion engine;
the execution device is configured to acquire, in the acquisition process, the instantaneous speed parameter based on a detection value from a sensor configured to detect a rotational behavior of the crankshaft of the internal combustion engine;
the instantaneous speed parameter is a parameter based on the rotation speed of the crankshaft of the internal combustion engine;
the first interval is a rotation angle interval of the crankshaft, the first interval including a compression top dead center;
each of the second intervals is smaller than an interval between rotation angles at each of which the compression top dead center is reached; and
the execution device is configured to output the probability of the misfire in at least one cylinder in which the compression top dead center is reached within the first interval, using the mapping.

3. The internal combustion engine condition determination apparatus according to claim 1, wherein:
the internal combustion engine includes a plurality of cylinders;
the condition of the internal combustion engine is variation in an air-fuel ratio among the plurality of cylinders;
the execution device is configured to execute, when a determination is made through the first determination process that the variation in the air-fuel ratio occurs among the plurality of cylinders, an addressing process of addressing a high degree of the variation in the air-fuel ratio by operating predetermined hardware;
the mapping data defines the mapping between the input including a rotation waveform variable and an air-fuel ratio detection variable based on an output from an air-fuel ratio sensor in each of a plurality of third intervals, and the output including an imbalance variable indicating a degree of variation among actual air-fuel ratios occurring when fuel injection valves are operated such that air-fuel ratios of air-fuel mixtures in the plurality of cylinders are controlled to be equal to each other;
the execution device is configured to acquire, in the acquisition process, the air-fuel ratio detection variable in each of the plurality of third intervals and the rotation waveform variable based on a detection value from a sensor configured to detect a rotational behavior of the crankshaft;
the rotation waveform variable indicates a difference between values of an instantaneous speed variable based on the rotation speed of the crankshaft in a plurality of fourth intervals;
the third intervals and the fourth intervals are angle intervals of the crankshaft, each of the angle intervals being smaller than an interval between rotation angles at each of which a compression top dead center is reached; and
the rotation waveform variable is included in time-series data within a predetermined angle interval larger than the interval between the rotation angles at each of which the compression top dead center is reached, and values of the air-fuel ratio detection variable are included in time-series data within the predetermined angle interval larger than the interval between the rotation angles at each of which the compression top dead center is reached.

4. An internal combustion engine condition determination system comprising:
the execution device according to claim 1; and
the storage device, wherein
the execution device includes a first execution device and a second execution device,
the first execution device is mounted on a vehicle, and is configured to execute the acquisition process, and a vehicle-side transmission process of transmitting data acquired through the acquisition process to an outside of the vehicle, and
the second execution device is disposed outside the vehicle, and is configured to execute an external reception process of receiving the data transmitted through the vehicle-side transmission process, and the first determination process.

5. A data analyzing apparatus comprising:
the second execution device according to claim 4; and
the storage device.

6. An internal combustion engine control apparatus comprising the first execution device according to claim 4.

* * * * *